United States Patent
Fox et al.

(10) Patent No.: US 11,887,025 B1
(45) Date of Patent: Jan. 30, 2024

(54) METHOD TO GENERATE PREDICTED VARIANCES OF AN OPERATION BASED ON DATA FROM ONE OR MORE CONNECTED DATABASES

(71) Applicant: American Airlines, Inc., Fort Worth, TX (US)

(72) Inventors: James Fox, Phoenix, AZ (US); Randeep Ramamurthy, Phoenix, AZ (US); Julianne Anderson, Tempe, AZ (US); Arthur Busse, Tempe, AZ (US); Marcial Lapp, Ann Arbor, MI (US); Daniel Muzich, Phoenix, AZ (US); Thomas Trenga, Mesa, AZ (US)

(73) Assignee: AMERICAN AIRLINES, INC., Fort Worth, TX (US)

(*) Notice: Subject to any disclaimer, the term of this patent is extended or adjusted under 35 U.S.C. 154(b) by 0 days.

(21) Appl. No.: 18/128,950

(22) Filed: Mar. 30, 2023

Related U.S. Application Data

(63) Continuation of application No. 17/945,848, filed on Sep. 15, 2022, now abandoned, which is a continuation of application No. 16/907,623, filed on Jun. 22, 2020, now abandoned, which is a continuation of application No. 15/812,723, filed on Nov. 14, 2017, now abandoned, which is a
(Continued)

(51) Int. Cl.
| | | |
|---|---|---|
| *G06Q 10/00* | (2023.01) | |
| *G06Q 30/00* | (2023.01) | |
| *G06Q 10/02* | (2012.01) | |
| *G06Q 30/0202* | (2023.01) | |
| *G06Q 50/30* | (2012.01) | |
| *G06Q 10/0637* | (2023.01) | |
| *G06Q 10/087* | (2023.01) | |

(52) U.S. Cl.
CPC ......... *G06Q 10/02* (2013.01); *G06Q 10/0637* (2013.01); *G06Q 10/087* (2013.01); *G06Q 30/0202* (2013.01); *G06Q 50/30* (2013.01)

(58) Field of Classification Search
None
See application file for complete search history.

(56) References Cited

U.S. PATENT DOCUMENTS

| | | |
|---|---|---|
| 3,668,403 A | 6/1972 | Meilander |
| 5,181,677 A | 6/1993 | Kaplan |

(Continued)

FOREIGN PATENT DOCUMENTS

| | | |
|---|---|---|
| DE | 102011007822 | 10/2012 |
| WO | WO9725684 | 7/1997 |

(Continued)

OTHER PUBLICATIONS

H. Yu and J.-g. Chen, "Airline robust overbooking strategy with limited information," 2010 7th International Conference on Service Systems and Service Management, Tokyo, Japan, 2010, pp. 1-5, doi: 10.1109/ICSSSM.2010.5530236. (Year: 2010).*

(Continued)

*Primary Examiner* — Matheus Ribeiro Stivaletti
(74) *Attorney, Agent, or Firm* — SNELL & WILMER L.L.P.

(57) ABSTRACT

Systems and methods to generate predicted variances of an operation based on data from one or more connected databases.

17 Claims, 6 Drawing Sheets

Related U.S. Application Data continuation of application No. 15/695,446, filed on Sep. 5, 2017, now abandoned, which is a continuation of application No. 14/038,278, filed on Sep. 26, 2013, now abandoned, which is a continuation of application No. 13/352,667, filed on Jan. 18, 2012, now Pat. No. 8,600,787, which is a continuation of application No. 13/348,417, filed on Jan. 11, 2012, now abandoned.

(60) Provisional application No. 61/561,245, filed on Nov. 17, 2011.

(56) References Cited

U.S. PATENT DOCUMENTS

| | | |
|---|---|---|
| 5,255,184 A | 10/1993 | Hornick et al. |
| 5,270,921 A | 12/1993 | Hornick |
| 5,832,454 A | 11/1998 | Jafri et al. |
| 5,918,209 A | 6/1999 | Campbell et al. |
| 5,929,842 A | 7/1999 | Vertregt |
| 5,978,770 A | 11/1999 | Waytena |
| 6,067,532 A | 5/2000 | Gebb |
| 6,077,077 A | 6/2000 | Geipe |
| 6,085,164 A | 7/2000 | Smith |
| 6,085,169 A | 7/2000 | Walker et al. |
| 6,085,976 A | 7/2000 | Sehr |
| 6,112,185 A | 8/2000 | Walker et al. |
| 6,134,534 A | 10/2000 | Walker et al. |
| 6,161,097 A | 12/2000 | Glass et al. |
| 6,263,315 B1 | 7/2001 | Talluri |
| 6,974,079 B1 | 12/2005 | Strothmann |
| 7,085,726 B1 | 8/2006 | Galperin et al. |
| 7,136,821 B1 | 11/2006 | Kohavi |
| 7,212,978 B2 | 5/2007 | Kowal et al. |
| 7,263,496 B1 | 8/2007 | Weigelt et al. |
| 7,327,262 B2 | 2/2008 | Motteram |
| 7,418,409 B1 | 8/2008 | Goel |
| 7,533,032 B1 | 5/2009 | Selby |
| 7,599,847 B2 | 10/2009 | Block et al. |
| 7,617,136 B1 | 11/2009 | Lessing et al. |
| 7,848,940 B1 | 12/2010 | Harniman et al. |
| 7,899,691 B1 | 3/2011 | Lee |
| 8,190,457 B1 | 5/2012 | Chandler et al. |
| 8,191,547 B2 | 6/2012 | Pellegrino |
| 8,452,625 B2 | 5/2013 | Maguire |
| 8,510,086 B1 | 8/2013 | Winkler |
| 8,589,193 B2 | 11/2013 | Maguire et al. |
| 8,700,440 B1 | 4/2014 | Andre |
| 2002/0059101 A1 | 5/2002 | Ratliff |
| 2002/0065699 A1 | 5/2002 | Talluri |
| 2002/0111935 A1 | 8/2002 | Jones |
| 2002/0120492 A1 | 8/2002 | Phillips et al. |
| 2002/0147767 A1 | 10/2002 | Brice et al. |
| 2002/0156659 A1 | 10/2002 | Walker et al. |
| 2002/0161610 A1 | 10/2002 | Walker et al. |
| 2002/0161689 A1 | 10/2002 | Segal |
| 2002/0173978 A1 | 11/2002 | Boies |
| 2002/0178034 A1 | 11/2002 | Gardner |
| 2003/0036928 A1 | 2/2003 | Kaenigsberg |
| 2003/0065542 A1 | 4/2003 | Gliozzi et al. |
| 2003/0115093 A1 | 6/2003 | Lim |
| 2003/0191725 A1 | 10/2003 | Ratliff |
| 2004/0158536 A1 | 8/2004 | Kowl |
| 2004/0230472 A1 | 11/2004 | Venkat |
| 2004/0249685 A1 | 12/2004 | Douglas |
| 2005/0065838 A1 | 3/2005 | Kalagnanm |
| 2005/0125266 A1 | 6/2005 | Bramnick et al. |
| 2005/0125267 A1 | 6/2005 | Bramnick et al. |
| 2005/0165628 A1 | 7/2005 | Vaaben |
| 2005/0177402 A1 | 8/2005 | Walker |
| 2005/0188089 A1 | 8/2005 | Lichtenstein et al. |
| 2005/0216317 A1 | 9/2005 | Medellin et al. |
| 2005/0246208 A1* | 11/2005 | Langerman ............ G06Q 10/02 705/5 |
| 2006/0195356 A1 | 8/2006 | Nerenhausen et al. |
| 2006/0200370 A1 | 9/2006 | Ratliff et al. |
| 2007/0143153 A1 | 6/2007 | Ashby |
| 2007/0244766 A1 | 10/2007 | Goel |
| 2007/0294117 A1 | 12/2007 | Lopp |
| 2008/0010918 A1 | 1/2008 | Bruggink |
| 2008/0013328 A1 | 1/2008 | Newbill |
| 2008/0027768 A1 | 1/2008 | Thurlow |
| 2008/0052185 A1 | 2/2008 | Goel |
| 2008/0071939 A1 | 3/2008 | Tanaka |
| 2008/0109187 A1 | 5/2008 | Kollgaard |
| 2008/0133284 A1 | 6/2008 | Birch |
| 2008/0133285 A1 | 6/2008 | Pandya |
| 2008/0183512 A1 | 7/2008 | Benzinger |
| 2009/0011263 A1 | 1/2009 | Forloni |
| 2009/0024423 A1 | 1/2009 | Hay |
| 2009/0030741 A1 | 1/2009 | Veitch |
| 2009/0063219 A1 | 3/2009 | Raufaste et al. |
| 2009/0088814 A1 | 4/2009 | Good |
| 2009/0112638 A1 | 4/2009 | Kneller |
| 2009/0182588 A1 | 7/2009 | Ashby |
| 2009/0216568 A1 | 8/2009 | Raufaste |
| 2009/0234710 A1 | 9/2009 | Belgaied |
| 2009/0287518 A1 | 11/2009 | Marode et al. |
| 2010/0153143 A1 | 6/2010 | Baggett |
| 2010/0250291 A1 | 9/2010 | Walker et al. |
| 2011/0010205 A1 | 1/2011 | Richards |
| 2011/0071886 A1 | 3/2011 | Schnur |
| 2011/0145087 A1 | 6/2011 | Daman |
| 2011/0153373 A1 | 6/2011 | Dantzig |
| 2012/0010912 A1* | 1/2012 | Lele ..................... G06Q 10/00 705/5 |
| 2012/0035965 A1 | 2/2012 | Maguire et al. |
| 2012/0078667 A1 | 3/2012 | Denker |
| 2012/0271679 A1 | 10/2012 | Schroder |
| 2012/0284064 A1 | 11/2012 | Sussman et al. |
| 2012/0310706 A1 | 12/2012 | Nguyen |
| 2013/0024217 A1 | 1/2013 | Pradignac |
| 2013/0054279 A1 | 2/2013 | Sharp et al. |
| 2013/0103434 A1 | 4/2013 | Cazeaux |
| 2013/0103439 A1 | 4/2013 | Vernitsky |
| 2013/0132132 A1* | 5/2013 | Fox ..................... G06Q 10/0631 705/5 |
| 2013/0339070 A1 | 12/2013 | Meghji |
| 2014/0039944 A1 | 2/2014 | Humbert |
| 2014/0052750 A1 | 2/2014 | Ciabrini |
| 2014/0067435 A1 | 3/2014 | Hasnas |
| 2014/0074853 A1 | 3/2014 | Nath |
| 2014/0089588 A1 | 3/2014 | Redoutey |
| 2014/0108067 A1 | 4/2014 | Gluhovsky |
| 2014/0136247 A1 | 5/2014 | Bareges et al. |
| 2014/0257881 A1 | 9/2014 | Tracy et al. |
| 2014/0278598 A1 | 9/2014 | Padgen |
| 2014/0337063 A1 | 11/2014 | Nelson et al. |
| 2014/0344023 A1 | 11/2014 | Chiu |
| 2015/0016617 A1 | 1/2015 | Jain |
| 2015/0154511 A1 | 6/2015 | Magnat |
| 2015/0166174 A1 | 6/2015 | Cox |
| 2015/0324326 A1 | 11/2015 | Chen |
| 2015/0371245 A1 | 12/2015 | Bental et al. |
| 2016/0080216 A1 | 3/2016 | Yu |
| 2016/0210564 A1 | 7/2016 | Guillard |
| 2016/0210584 A1 | 7/2016 | Guillard |
| 2016/0232532 A1 | 8/2016 | Canis et al. |
| 2016/0350396 A1 | 12/2016 | Blanc |
| 2017/0061333 A1 | 3/2017 | Endres |
| 2017/0213159 A1 | 7/2017 | Hartmans |
| 2022/0222692 A1 | 7/2022 | Tracy |

FOREIGN PATENT DOCUMENTS

| | | |
|---|---|---|
| WO | WO0191001 | 11/2001 |
| WO | WO2005050410 | 6/2005 |

OTHER PUBLICATIONS

R. Z. Cao, W. Ding, X. Y. He and H. Zhang, "Data mining techniques to improve no-show forecasting," Proceedings of 2010

(56) References Cited

OTHER PUBLICATIONS

IEEE International Conference on Service Operations and Logistics, and Informatics, QingDao, China, 2010, pp. 40-45, doi: 10.1109/SOLI.2010.5551620. (Year: 2010).*
"Fundamental Pricing and Revenue Management Chapter 4," Apr. 2015, <https://castr.vse.gmu.edu/SYST660/Chap4_Fundamentals_of_Pricing_and_Revenue_Management.pdf>.
Richard Ratliff, "a multi-flight recapture heuristic for estimating unconstrained demand from airline bookings", published by palgrave journals in 2007, all pages. (Year: 2007).
Reyes, "Hybrid Forecasting for airline revenue management in Semi restricted fare structures", published by MIT in 2006, all pages. (Year: 2006).
Savoyen, "Airline revenue management methods for less restricted fare structures", published by MIT in 2005, all pages. (Year: 2005).
Skwarek, "Competitive Impacts of Yield Management System Components: Forecasting and Sell-up Models", published by MIT in 1994, all pages. (Year: 1994).
Temath, "Performance measurement in airline revenue management—a simulation based assessment of the network based revenue opportunity model", published by Univeristy of Paderborn in 2010, all pages. (Year: 2010).
Saleh, "a new unconstraining method for demand forecasting", published by IEEE in 2012, all pages (Year: 2012).
Guo, "Unconstraining methods in revenue management systems: research overview and prospects", published by Hindawi Publishing Corp. in 2012, all pages (Year: 2012).
Koole, "estimating unconstrained customer choice set demand: a case study on airline reservation data", published by Journal of Choice Modeling in 2011, all pages (Year: 2011).
Cleophas, "Simulation-based analyisis of forecast performance evaluations for airline revenue management", published by Core in Jul. 2009, all pages (Year: 2009).
Wickham, "Evaluation of Forecasting Techniques for Short Term Demand of Air transportation", published by MIT in 1993, all pages (Year: 1993).
Williamson, "Airline Network Seat Inventory control: Methodologies and Revenue Impacts", published by MIT in 1986, all pages (Year: 1986).
Bonnet, et al., "Database Tuning (part 1)." EDBT Summer School 2007, 99 pages.
Cusano, "Airline Revenue Management under Alternative Fare Structures", published by MIT in 2003, 120 pages (Year 2003).
Belobaba, "The Global Airline Industry", published by Wiley, 508 pages (Year 2009), article can be found in IFW on U.S. Appl. No. 16/854/673 uploaded May 11, 2023. File was too large to upload.
Lili, "Airline Seat Allocation Competition", published by International Transaction in Operational Research, pp. 439-459, (Year 2008).
Boyd, "Revenue Management and Dynamic Pricing: Part 1," PROS Revenue Management, Sep. 2002, 77 pages, https://www.ima.umn.edu/talks/workshops/9-9-13.2002/boyd/boyd.ppt.
Williamson, "Comparison of Optimization Techniques for Origin-Destination Seat Inventory Control," Flight Transportation Laboratory Report R 88-2, pp. 1-169, May 1988.
"Fundamentals of Pricing and Revenue Management Chapter 4," George Mason University, Feb. 2010, 70 pages, retrieved from: http://catsr.ite.gmu.edu/SYST660/Chap4_Fundamentals_of_Pricing_and_Revenue_Management.pdf.
Kayser, "RM Methods for Multiple Fare Structure Environments," published by Massachusetts Institute of Technology on Jun. 2008, pp. 1-115.
Gorin, "Incorporating cancel and rebook behavior in revenue management optimization," published by Journal of Revenue and Pricing Management, vol. 11, No. 6, Jan. 24, 2012, pp. 645-660.
Fiig, "Optimization of mixed fare structures: Theory and applications," published by Journal of Revenue and Pricing Management, vol. 9, No. 1/2, Apr. 7, 2009, pp. 152-170.

Belobaba, "Airline Revenue Management: Flight Leg and Network Optimization—1.201 Transportation Systems Analysis: Demand & Economics," Fall 2008, http://ocw.mit.edu/courses/civil-and-environmental-engineering/1-201j-transportation-systems-analysis-demand-and-econimics-fall-2008/lecture-notes/MIT1_201JF08_lec17.pdf retrieved Apr. 20, 2015, 40 pages.
Department of Transportation, "Enhancing Airline Passenger Protections," http://web.archive.org/web/20121031135020/http://usatoday30.usatoday.com/travel/pdf/dot_enhancing_airline_passenger_protections.pdf, Oct. 31, 2012, retrieved Apr. 20, 2015, 84 pages.
Joseph Coughlan, "Airline Overbooking in the Multi-Class Case" dated Jan. 1, 1999, Dublin Institute of Technology, Journal of the Operational Research Society, vol. 50, 1999, pp. 1098-1103.
"Optimal Overbooking" dated Feb. 11, 2002 by Duke Mathematics Department, Team 180, 42 Pages.
Luke Ouko, Arnan Sipitakiat and Carla Gomez-Monroy, "Should Airlines Overbook?" dated May 12, 2003, Systems Dynamics for Engineers, 28 Pages.
Alexander Erdelyi and Huseyin Topaloglu, "A Dynamic Programming Decomposition Method for Making Overbooking Decisions over an Airline Network" dated Jun. 1, 2009, School of Operations Research and Information Engineering, Cornell University, Ithaca, New York, pp. 1-29.
Zhao et al. "A Dynamic Model for Airline Seat Allocation with Passenger Diversion and No-Shows"; Transportation Science, Feb. 2001, vol. 35, No. 1, pp. 80-98.
Cao et al "Data mining Techniques to improve no-show forecasting" Service Operations and Logistics and Informatics (SOLI), 2010 IEEE International Conference Jul. 2010, pp. 40-45.
Garrow et al. "Predicting Air Travelers' No-Show and Standby Behavior Using Passenger and Directional Itinerary Information" Journal of Air Transport Management Jun. 23, 2004, pp. 1-32.
Illiescu, et al., "Analysis of U.S. Airlines Passengers' Refund and Exchange Behavior Across Multiple Airlines," pp. 1-25, May 2006.
El-Haber, Sharbel and El-Taha, Muhammad, "Dynamic two-leg airline seat inventory control with overbooking, cancellations and no-shows, "Journal of Revenue and Pricing Management, vol. 3, No. 2, 2004, pp. 143-170.
Talluri, Kalyan and van Ryzon, Garrett, "An Analysis of Bid-Price Controls for Network Revenue Managment," Management Science/vol. 44, Part 1 of 2, Nov. 1998.
Chatwin, Richard,"Multiperiod Airline Overbooking with a Single Fare Class," Operations Research, vol. 46, No. 6, Nov.-Dec. 1998.
Pak, Kevin and Piersma, Nanda, "Overview of OR Techniques for Airline Revenue Management," Statistica Neerlandica (2002) bol. 56, nr. 4, pp. 479-495.
Belobaba, "Air Travel Demand and Airline Seat Inventory Management", published by MIT in 1982, all pages (Year: 1982).
Obeng, K., and R. Sakano, "Airline Fare and Seat Management Strategies with Demand Dependency." Journal of air transport management 24 (2012): 42-48. Web. (Year: 2012).
Menkes et al., "America West Airlines Develops Efficient Boarding Strategies," Interfaces, vol. 35, No. 3, May-Jun. 2005, pp. 191-201.
USPTO, Office Action dated Sep. 26, 2012 in U.S. Appl. No. 13/352,757.
USPTO, Office Action dated Oct. 9, 2012 in U.S. Appl. No. 13/352,667.
USPTO, Office Action dated Mar. 27, 2013, 2013 in U.S. Appl. No. 13/352,628.
USPTO, Office Action dated Apr. 8, 2013, 2013 in U.S. Appl. No. 13/348,417.
USPTO, Requirement for Information dated Apr. 11, 2013 in U.S. Appl. No. 13/352,719.
USPTO, Office Action dated Sep. 12, 2013 in U.S. Appl. No. 13/352,667.
USPTO, Final Office Action dated Oct. 16, 2013 in U.S. Appl. No. 13/352,628.
USPTO, Notice of Allowance dated Oct. 25, 2013 in U.S. Appl. No. 13/352,667.
USPTO, Office Action dated Oct. 31, 2013 in U.S. Appl. No. 13/348,417.
USPTO, Advisory Action dated Jan. 16, 2014 in U.S. Appl. No. 13/352,628.

(56) References Cited

OTHER PUBLICATIONS

USPTO, Office Action dated May 9, 2014 in U.S. Appl. No. 13/352,719.
USPTO, Office Action dated Jun. 9, 2014 in U.S. Appl. No. 13/348,417.
USPTO, Final Office Action dated Jun. 18, 2014 in U.S. Appl. No. 13/352,719.
USPTO, Office Action dated Aug. 5, 2014 in U.S. Appl. No. 13/352,719.
USPTO, Final Office Action dated Sep. 8, 2014 in U.S. Appl. No. 13/352,719.
USPTO, Office Action dated Oct. 9, 2014 in U.S. Appl. No. 13/348,417.
USPTO, Final Office Action dated Oct. 22, 2014 in U.S. Appl. No. 13/348,417.
USPTO, Advisory Action dated Jan. 2, 2015 in U.S. Appl. No. 13/348,417.
USPTO, Office Action dated Feb. 13, 2015 in U.S. Appl. No. 13/352,628.
USPTO, Final Office Action dated Mar. 12, 2015 in U.S. Appl. No. 13/352,628.
USPTO, Advisory Action dated Apr. 3, 2015 in U.S. Appl. No. 13/352,628.
USPTO, Office Action dated Mar. 23, 2015 in U.S. Appl. No. 14/038,278.
USPTO, Office Action dated May 11, 2015 in U.S. Appl. No. 13/791,711.
USPTO, Office Action dated Jun. 5, 2015 in U.S. Appl. No. 13/791,672.
USPTO, Office Action dated Jun. 18, 2015 in U.S. Appl. No. 13/348,417.
USPTO, Office Action dated Jun. 25, 2015 in U.S. Appl. No. 13/352,719.
USPTO, Office Action dated Jul. 10, 2015 in U.S. Appl. No. 13/352,628.
USPTO, Final Office Action dated Sep. 8, 2015 in U.S. Appl. No. 14/038,278.
USPTO, Office Action dated Sep. 9, 2015 in U.S. Appl. No. 13/791,691.
USPTO, Final Office Action dated Sep. 10, 2015 in U.S. Appl. No. 13/352,719.
USPTO, Final Office Action dated Sep. 11, 2015 in U.S. Appl. No. 13/348,417.
USPTO, Advisory Action dated Sep. 18, 2015 in U.S. Appl. No. 14/038,278.
USPTO, Advisory Action dated Sep. 24, 2015 in U.S. Appl. No. 13/348,417.
USPTO, Advisory Action dated Sep. 25, 2015 in U.S. Appl. No. 13/352,719.
USPTO, Final Office Action dated Sep. 25, 2015 in U.S. Appl. No. 13/791,711.
USPTO, Final Office Action dated Sep. 29, 2015 in U.S. Appl. No. 13/352,628.
USPTO, Advisory Action dated Oct. 16, 2015 in U.S. Appl. No. 13/352,628.
USPTO, Office Action dated Nov. 6, 2015 in U.S. Appl. No. 13/352,719.
USPTO, Advisory Action dated Nov. 6, 2015 in U.S. Appl. No. 13/791,711.
USPTO, Final Office Action dated Nov. 6, 2015 in U.S. Appl. No. 14/038,278.
USPTO, Office Action dated Nov. 25, 2015 in U.S. Appl. No. 13/348,417.
USPTO, Office Action dated Dec. 3, 2015 in U.S. Appl. No. 13/352,628.
USPTO, Restriction Requirement dated Dec. 10, 2015 in U.S. Appl. No. 14/157,960.
USPTO, Final Office Action dated Dec. 24, 2015 in U.S. Appl. No. 13/791,672.
USPTO, Advisory Action dated Dec. 30, 2015 in U.S. Appl. No. 14/038,278.
USPTO, Office Action dated Feb. 1, 2016 in U.S. Appl. No. 14/157,869.
USPTO, Office Action dated Feb. 11, 2016 in U.S. Appl. No. 14/038,278.
USPTO, Final Office Action dated Feb. 25, 2016 in U.S. Appl. No. 13/791,691.
USPTO, Final Office Action dated Mar. 18, 2016 in U.S. Appl. No. 13/352,719.
USPTO, Final Office Action dated Mar. 23, 2016 in U.S. Appl. No. 13/348,417.
USPTO, Final Office Action dated Mar. 23, 2016 in U.S. Appl. No. 13/352,628.
USPTO, Advisory Action dated Apr. 18, 2016 in U.S. Appl. No. 13/791,672.
USPTO, Office Action dated May 5, 2016 in U.S. Appl. No. 14/157,960.
USPTO, Advisory Action dated May 12, 2016 in U.S. Appl. No. 13/348,417.
USPTO, Advisory Action dated May 12, 2016 in U.S. Appl. No. 13/352,719.
USPTO, Advisory Action dated May 20, 2016 in U.S. Appl. No. 13/791,691.
USPTO, Office Action dated May 20, 2016 in U.S. Appl. No. 13/791,711.
USPTO, Advisory Action dated May 27, 2016 in U.S. Appl. No. 13/352,628.
USPTO, Final Office Action dated Jun. 14, 2016 in U.S. Appl. No. 14/038,278.
USPTO, Office Action dated Jun. 30, 2016 in U.S. Appl. No. 13/352,719.
USPTO, Office Action dated Jul. 1, 2016 in U.S. Appl. No. 13/348,417.
USPTO, Office Action dated Jul. 1, 2016 in U.S. Appl. No. 13/352,628.
USPTO, Office Action dated Jul. 5, 2016 in U.S. Appl. No. 13/791,691.
USPTO, Advisory Action dated Jul. 11, 2016 in U.S. Appl. No. 14/038,278.
USPTO, Final Office Action dated Aug. 11, 2016 in U.S. Appl. No. 14/157,869.
USPTO, Office Action dated Sep. 13, 2016 in U.S. Appl. No. 13/791,672.
USPTO, Office Action dated Sep. 28, 2016 in U.S. Appl. No. 14/038,278.
USPTO, Advisory Action dated Nov. 2, 2016 in U.S. Appl. No. 14/157,869.
USPTO, Final Office Action dated Nov. 10, 2016 in U.S. Appl. No. 13/348,417.
USPTO, Final Office Action dated Nov. 10, 2016 in U.S. Appl. No. 13/791,711.
USPTO, Final Office Action dated Nov. 14, 2016 in U.S. Appl. No. 13/352,628.
USPTO, Final Office Action dated Nov. 15, 2016 in U.S. Appl. No. 13/352,719.
USPTO, Final Office Action dated Nov. 30, 2016 in U.S. Appl. No. 14/157,960.
USPTO, Final Office Action dated Dec. 15, 2016 in U.S. Appl. No. 13/791,691.
USPTO, Office Action dated Dec. 21, 2016 in U.S. Appl. No. 14/157,869.
USPTO, Advisory Action dated Feb. 2, 2017 in U.S. Appl. No. 13/791,711.
USPTO, Advisory Action dated Feb. 6, 2017 in U.S. Appl. No. 13/352,628.
USPTO, Advisory Action dated Feb. 7, 2017 in U.S. Appl. No. 13/352,719.
USPTO, Advisory Action dated Feb. 7, 2017 in U.S. Appl. No. 14/157,960.
USPTO, Advisory Action dated Feb. 13, 2017 in U.S. Appl. No. 13/348,417.

(56) References Cited

OTHER PUBLICATIONS

USPTO, Final Office Action dated Feb. 24, 2017 in U.S. Appl. No. 13/352,719.
USPTO, Final Office Action dated Feb. 27, 2017 in U.S. Appl. No. 13/352,628.
USPTO, Advisory Action dated Feb. 28, 2017 in U.S. Appl. No. 13/791,691.
USPTO, Final Office Action dated Mar. 22, 2017 in U.S. Appl. No. 14/038,278.
USPTO, Office Action dated Mar. 23, 2017 in U.S. Appl. No. 15/041,669.
USPTO, Office Action dated Mar. 27, 2017 in U.S. Appl. No. 13/348,417.
USPTO, Final Office Action dated Mar. 31, 2017 in U.S. Appl. No. 13/791,672.
USPTO, Office Action dated Apr. 12, 2017 in U.S. Appl. No. 13/791,691.
USPTO, Advisory Action dated Apr. 25, 2017 in U.S. Appl. No. 13/352,719.
USPTO, Office Action dated May 4, 2017 in U.S. Appl. No. 13/352,719.
USPTO, Advisory Action dated May 15, 2017 in U.S. Appl. No. 14/038,278.
USPTO, Advisory Action dated May 22, 2017 in U.S. Appl. No. 13/352,628.
USPTO, Office Action dated Jun. 6, 2017 in U.S. Appl. No. 13/352,628.
USPTO, Final Office Action dated Jun. 7, 2017 in U.S. Appl. No. 14/157,869.
USPTO, Final Office Action dated Jun. 16, 2017 in U.S. Appl. No. 14/038,278.
USPTO, Notice of Allowance dated Jun. 27, 2017 in U.S. Appl. No. 13/791,672.
USPTO, Office Action dated Jun. 27, 2017 in U.S. Appl. No. 14/157,960.
USPTO, Final Office Action dated Jul. 27, 2017 in U.S. Appl. No. 13/791,691.
USPTO, Final Office Action dated Aug. 11, 2017 in U.S. Appl. No. 13/352,719.
USPTO, Advisory Action dated Aug. 16, 2017 in U.S. Appl. No. 14/157,869.
USPTO, Final Office Action dated Aug. 17, 2017 in U.S. Appl. No. 13/348,417.
USPTO, Advisory Action dated Aug. 23, 2017 in U.S. Appl. No. 14/038,278.
USPTO, Office Action dated Sep. 8, 2017 in U.S. Appl. No. 13/791,711.
USPTO, Advisory Action dated Sep. 28, 2017 in U.S. Appl. No. 13/791,691.
USPTO, Final Office Action dated Oct. 4, 2017 in U.S. Appl. No. 15/041,669.
USPTO, Final Office Action dated Oct. 5, 2017 in U.S. Appl. No. 13/352,628.
USPTO, Advisory Action dated Oct. 17, 2017 in U.S. Appl. No. 13/348,417.
USPTO, Advisory Action dated Oct. 12, 2017 in U.S. Appl. No. 13/352,719.
USPTO, Advisory Action dated Nov. 15, 2017 in U.S. Appl. No. 15/041,669.
USPTO, Final Office Action dated Dec. 21, 2017 in U.S. Appl. No. 14/157,960.
USPTO, Advisory Action dated Jan. 26, 2018 in U.S. Appl. No. 14/157,960.
USPTO, Final Office Action dated Feb. 7, 2018 in U.S. Appl. No. 13/791,711.
USPTO, Advisory Action dated Mar. 30, 2018 in U.S. Appl. No. 13/791,711.
USPTO, Non-Final Office Action dated Jul. 26, 2018 in U.S. Appl. No. 13/791,711.
USPTO, Final Office Action dated Oct. 19, 2018 in U.S. Appl. No. 13/791,711.
USPTO, Advisory Action dated Nov. 5, 2018 in U.S. Appl. No. 13/791,711.
USPTO, Non-Final Office Action dated Dec. 31, 2018 in U.S. Appl. No. 15/693,140.
USPTO, Non-Final Office Action dated Feb. 7, 2019 in U.S. Appl. No. 15/695,466.
USPTO, Final Office Action dated May 20, 2019 in U.S. Appl. No. 15/695,466.
USPTO, Non-Final Office Action dated Jun. 26, 2019 in U.S. Appl. No. 13/791,711.
USPTO, Advisory action dated Jun. 27, 19 in U.S. Appl. No. 15/695,446.
USPTO, Final Office action dated Jul. 9, 19 in U.S. Appl. No. 15/693,140.
USPTO, Non-Final Office Action dated Jul. 11, 2019 in U.S. Appl. No. 15/809,105.
USPTO, Non-Final Office Action dated Jul. 25, 2019 in U.S. Appl. No. 15/823,888.
USPTO, Non-Final Office Action dated Aug. 7, 2019 in U.S. Appl. No. 15/726,207.
USPTO, Advisory Action dated Aug. 19, 2019 in U.S. Appl. No. 15/693,140.
USPTO, Non-Final Office Action dated Aug. 21, 2019 in U.S. Appl. No. 15/695,446.
USPTO, Non-Final Office Action dated Sep. 3, 2019 in U.S. Appl. No. 15/884,094.
USPTO, Final Office Action dated Sep. 5, 2019 in U.S. Appl. No. 15/809,105.
USPTO, Final Office Action dated Sep. 12, 2019 in U.S. Appl. No. 13/791,711.
USPTO, Non-Final Office Action dated Sep. 26, 2019 in U.S. Appl. No. 15/793,676.
USPTO, Non-Final Office Action dated Sep. 30, 2019 in U.S. Appl. No. 15/812,723.
USPTO, Non-Final Office Action dated Nov. 18, 2019 in U.S. Appl. No. 15/693, 140.
USPTO, Advisory Action dated Nov. 27, 2019 in U.S. Appl. No. 13/791,711.
USPTO, Advisory Action dated Nov. 29, 2019 in U.S. Appl. No. 15/809,105.
USPTO, Final Office Action dated Dec. 31, 2019 in U.S. Appl. No. 15/809,105.
USPTO, Final Office Action dated Jan. 14, 2020 in U.S. Appl. No. 15/823,888.
USPTO, Final Office Action dated Jan. 22, 2020 in U.S. Appl. No. 15/726,207.
USPTO, Final Office Action dated Jan. 28, 2020 in U.S. Appl. No. 15/884,094.
USPTO, Final Office Action dated Feb. 6, 2020 in U.S. Appl. No. 15/695,446.
USPTO, Final Office Action dated Feb. 7, 2020 in U.S. Appl. No. 15/793,676.
USPTO, Final Office Action dated Feb. 13, 2020 in U.S. Appl. No. 15/812,723.
USPTO, Notice of Allowance dated Feb. 21, 2020 in U.S. Appl. No. 15/726,207.
USPTO, Advisory Action dated Feb. 28, 2020 in U.S. Appl. No. 15/695,446.
USPTO, Advisory Action dated Feb. 28, 2020 in U.S. Appl. No. 15/793,676.
USPTO, Advisory Action dated Feb. 28, 2020 in U.S. Appl. No. 15/812,723.
USPTO, Advisory Action dated Feb. 28, 2020 in U.S. Appl. No. 15/809,105.
USPTO, Advisory Action dated Feb. 28, 2020 in U.S. Appl. No. 15/823,888.
USPTO, Final Office Action dated May 4, 2020 in U.S. Appl. No. 15/693,140.
USPTO, Advisory Action dated May 18, 2020 in U.S. Appl. No. 15/884,094.

(56) References Cited

OTHER PUBLICATIONS

USPTO, Non-Final Office Action dated May 21, 2020 in U.S. Appl. No. 15/823,888.
USPTO, Advisory Action dated Jun. 2, 2020 in U.S. Appl. No. 15/693,140.
USPTO, Notice of Allowance dated Jul. 1, 2020 in U.S. Appl. No. 15/823,888.
USPTO, Notice of Allowance dated Jul. 13, 2020 in U.S. Appl. No. 15/693,140.
USPTO, Notice of Allowance dated Jul. 10, 2020 in U.S. Appl. No. 15/884,094.
USPTO, Notice of Allowance dated Jul. 16, 2020 in U.S. Appl. No. 15/823,888.
USPTO; Non-Final Office Action dated Sep. 24, 2020 in U.S. Appl. No. 13/791,711.
USPTO; Final Office Action dated Nov. 13, 2020 in U.S. Appl. No. 13/791,711.
USPTO; Advisory Action dated Dec. 3, 2020 in U.S. Appl. No. 13/791,711.
USPTO; Final Office Action dated Nov. 15, 2021 in U.S. Appl. No. 16/600,003.
USPTO; Non-Final Office Action dated Nov. 15, 2021 in U.S. Appl. No. 16/600,003.
USPTO, Non-Final Office Action dated Aug. 18, 2021 in U.S. Appl. No. 13/791,711.
USPTO, Final Office Action dated Nov. 24, 2021 in U.S. Appl. No. 13/791,711.
USPTO, Notice of Allowance dated Jan. 7, 2022 in U.S. Appl. No. 13/791,711.
USPTO, Final Office Action dated Mar. 9, 22 in U.S. Appl. No. 16/907,623.
USPTO, Final Office Action dated Mar. 17, 22 in U.S. Appl. No. 16/907,665.
USPTO, Final Office Action dated Mar. 21, 22 in U.S. Appl. No. 16/907,694.
USPTO, Non-Final Office Action dated Mar. 29, 22 in U.S. Appl. No. 16/600,003.
USPTO, Advisory Action dated Feb. 7, 2022 in U.S. Appl. No. 16/600,003.
USPTO, Advisory Action dated May 6, 2022 in U.S. Appl. No. 16/907,623.
USPTO, Advisory Action dated May 6, 2022 in U.S. Appl. No. 16/907,665.
USPTO, Advisory Action dated May 9, 2022 in U.S. Appl. No. 16/907,694.
USPTO, Non-Final Office Action dated May 6, 2022 in U.S. Appl. No. 16/930,801.
USPTO, Non-Final Office Action dated Jun. 23, 2022 in U.S. Appl. No. 16/991,470.
USPTO, Non-Final Office Action dated Jul. 22, 2022 in U.S. Appl. No. 16/991,588.
USPTO, Final Office Action dated Jun. 24, 2022 in U.S. Appl. No. 16/907,623.
USPTO, Final Office Action dated Jun. 24, 2022 in U.S. Appl. No. 16/907,665.
USPTO, Final Office Action dated Jun. 24, 2022 in U.S. Appl. No. 16/907,694.
USPTO, Final Office Action dated Jul. 13, 2022 in U.S. Appl. No. 16/600,003.
USPTO, Advisory Action dated Sep. 2, 2022 in U.S. Appl. No. 16/600,003.
USPTO, Advisory Action dated Sep. 14, 2022 in U.S. Appl. No. 16/907,623.
USPTO, Non-Final Office Action dated Oct. 12, 2022 in U.S. Appl. No. 16/854,673.
USPTO, Final Office Action dated Sep. 19, 2022 in U.S. Appl. No. 16/991,470.
USPTO, Final Office Action dated Sep. 19, 2022 in U.S. Appl. No. 16/930,801.
Notice of Allowance dated Nov. 23, 2022 in U.S. Appl. No. 16/930,801.
Notice of Allowance dated Nov. 23, 2022 in U.S. Appl. No. 16/991,470.
Notice of Allowance dated Feb. 1, 2023 in U.S. Appl. No. 16/600,003.
USPTO, Non-Final Office Action dated Jan. 3, 2023 in U.S. Appl. No. 17/945,848.
USPTO, Final Office Action dated Jan. 24, 2023 in U.S. Appl. No. 16/854,673.
USPTO, Final Office Action dated Jan. 31, 2023 in U.S. Appl. No. 17/954,643.
USPTO, Final Office Action dated Feb. 2, 2023 in U.S. Appl. No. 17/954,690.
USPTO, Advisory Action dated Mar. 9, 2023 in U.S. Appl. No. 16/854,673.
USPTO, Advisory Action dated Mar. 27, 2023 in U.S. Appl. No. 16/991,588.
USPTO, Final Office Action dated Feb. 8, 2023 in U.S. Appl. No. 16/991,588.
USPTO; Non-Final Office Action dated Jul. 6, 2015 in U.S. Appl. No. 13/837,462.
USPTO; Non-Final Office Action dated Dec. 3, 2015 in U.S. Appl. No. 13/837,462.
USPTO; Final Office Action dated Apr. 14, 2016 in U.S. Appl. No. 13/837,462.
USPTO; Advisory Action dated Jun. 30, 2016 in U.S. Appl. No. 13/837,462.
USPTO; Non-Final Office Action dated Oct. 11, 2016 in U.S. Appl. No. 13/837,462.
USPTO; Final Action dated May 4, 2017 in U.S. Appl. No. 13/837,462.
USPTO; Advisory Action dated Jul. 17, 2017 in U.S. Appl. No. 13/837,462.
USPTO; Non-Final Office Action dated Jun. 19, 2018 in U.S. Appl. No. 13/837,462.
USPTO; Final Office Action dated Oct. 11, 2018 in U.S. Appl. No. 13/837,462.
USPTO; Advisory Action dated Oct. 31, 2018 in U.S. Appl. No. 13/837,462.
USPTO; Non-Final Office Action dated Jan. 2, 2019 in U.S. Appl. No. 13/837,462.
USPTO; Final Office Action dated Jun. 21, 2019 in U.S. Appl. No. 13/837,462.
USPTO; Advisory Action dated Aug. 15, 2019 in U.S. Appl. No. 13/837,462.
USPTO; Non-Final Office Action dated Jan. 10, 2020 in U.S. Appl. No. 13/837,462.
USPTO; Final Office Action dated Apr. 17, 2020 in U.S. Appl. No. 13/837,462.
USPTO; Advisory Action dated May 14, 2020 in U.S. Appl. No. 13/837,462.
USPTO; Non-Final Office Action dated Jun. 27, 2022 in U.S. Appl. No. 16/887,343.
USPTO; Notice of Allowance dated Oct. 21, 2022 in U.S. Appl. No. 16/887,343.
USPTO; Non-Final Office Action dated May 11, 2023 in U.S. Appl. No. 16/854,673.
USPTO; Non-Final Office Action dated Mar. 30, 2023 in U.S. Appl. No. 17/978,743.
USPTO; Non-Final Office Action dated Jun. 7, 2023 in U.S. Appl. No. 16/991,588.
USPTO; Non-Final Office Action dated Aug. 3, 2023 in U.S. Appl. No. 17/708,445.
USPTO; Non-Final Office Action dated Sep. 14, 2023 in U.S. Appl. No. 18/114,562.
USPTO; Final Office Action dated Aug. 31, 2023 in U.S. Appl. No. 17/708,445.
USPTO; Final Office Action dated Sep. 11, 2023 in U.S. Appl. No. 16/854,673.
USPTO; Notice of Allowance dated Sep. 28, 2023 in U.S. Appl. No. 17/978,743.

(56) References Cited

OTHER PUBLICATIONS

Low, James Thomas, "Analysis of Passenger Congestion Delays at a Metropolitan Airport: A System Simulation Approach", University of Michigan, 1977, 337 pages.
USPTO; Advisory Action dated Oct. 26, 2023 in U.S. Appl. No. 16/854,673.
USPTO; Non-Final Office Action dated Nov. 24, 2023 in U.S. Appl. No. 16/854,673.
USPTO; Final Office Action dated Nov. 24, 2023 in U.S. Appl. No. 16/991,588.

* cited by examiner

200

```
COST ENGINE 148 FORECASTS A SPOILED SEAT
(SS) COST FOR EACH SEAT
205
          │
          ▼
COST ENGINE 148 FORECASTS A DENIED
BOARDING (DB) COST FOR THE FLIGHT
210
          │
          ▼
NSF 149 DETERMINES A BOOKED PASSENGER
NO-SHOW FORECAST (NSF) FOR EACH
PASSENGER
215
          │
          ▼
NSF 149 AGGREGATES THE BOOKED
PASSENGER NSF AND AN UNBOOKED
PASSENGER NSF TO CREATE A FLIGHT NSF
220
          │
          ▼
OPTIMIZER 147 DETERMINES AN AUTHORIZED
SEAT ALLOCATION FOR THE FLIGHT THAT
MINIMIZES AN OVERBOOKING COST
225
          │
          ▼
MARS 115 UPDATES AN AUTHORIZATION
PARAMETER FOR THE FLIGHT BASED UPON THE
AUTHORIZED SEAT ALLOCATION
230
```

Figure 2 – DETERMINING AU TO MIN OVERBOOKING COST

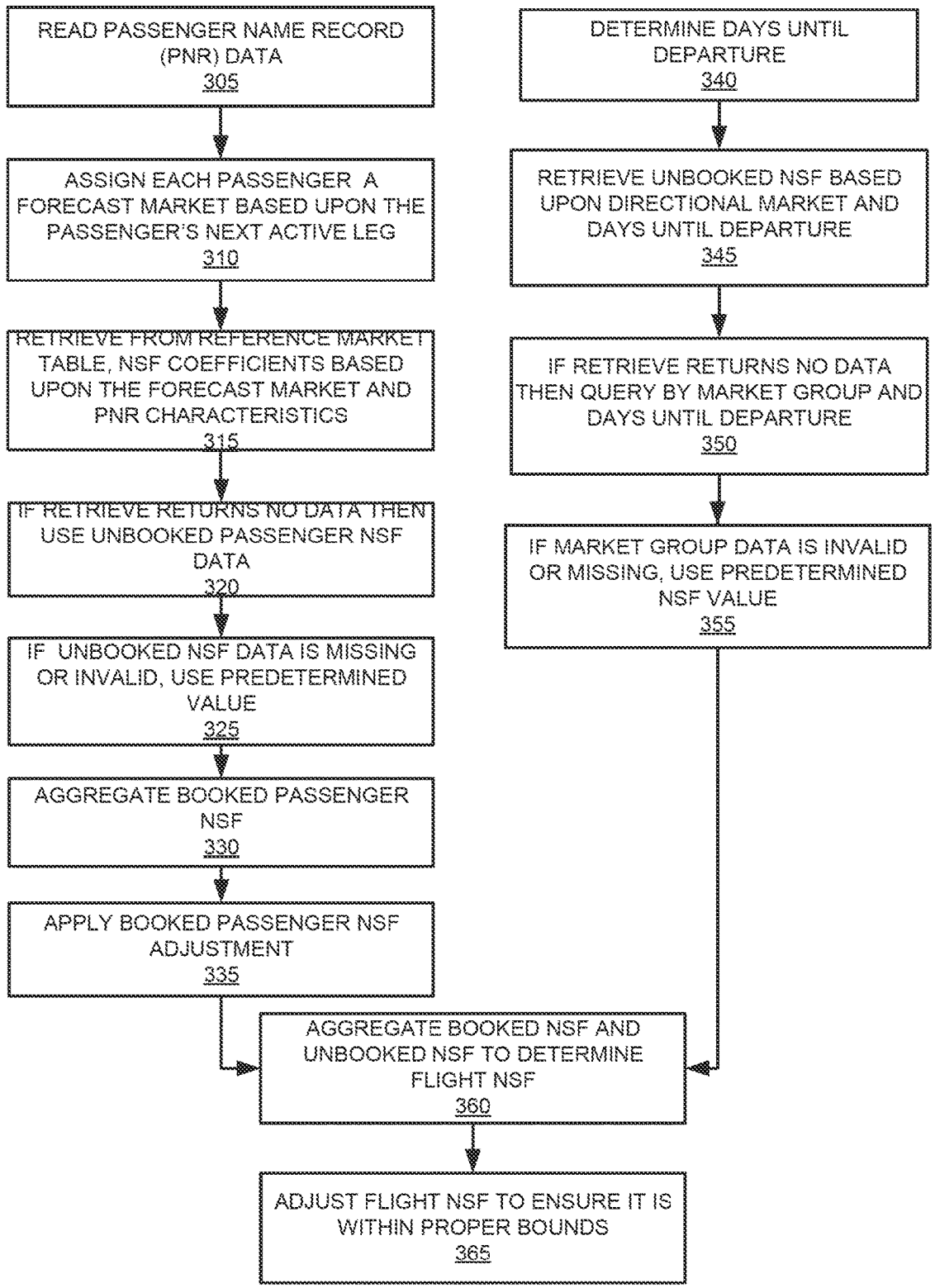
Figure 3 - NSF

Denied Boarding Cost

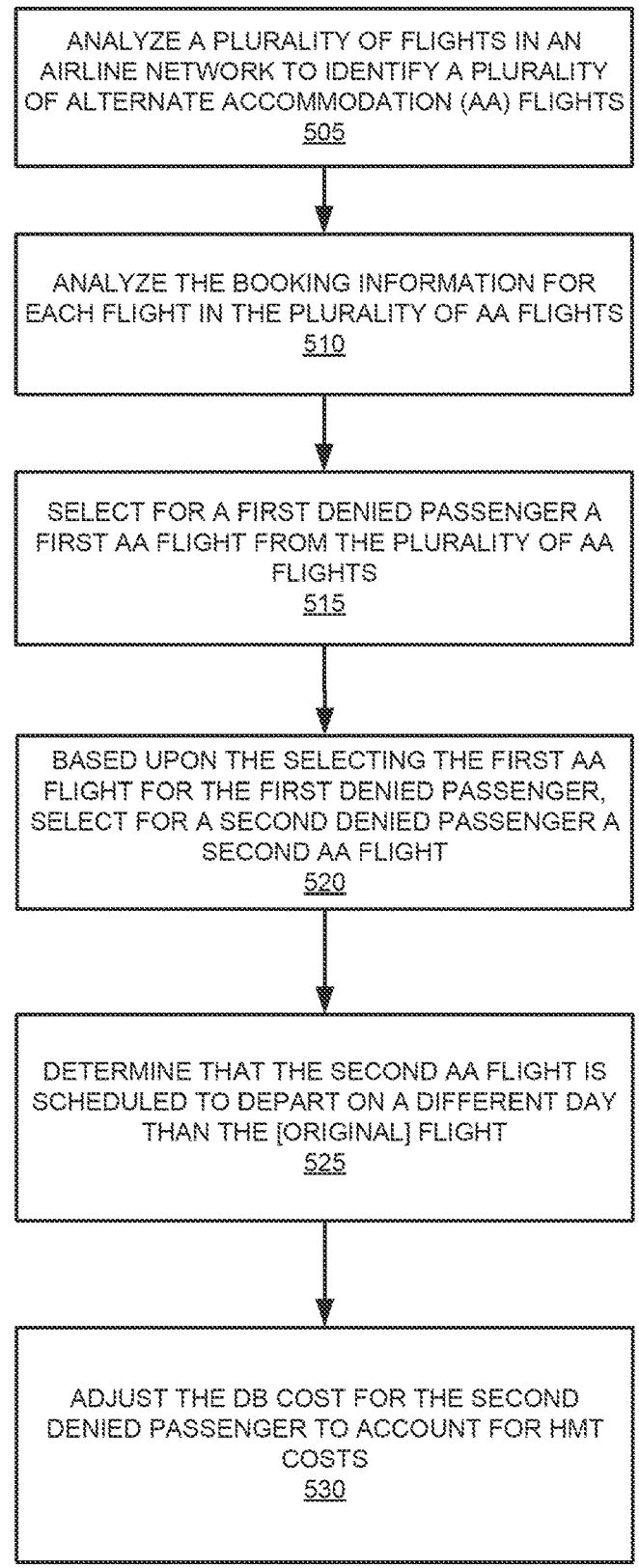
Figure 5 – Dynamic Calculation of Costs

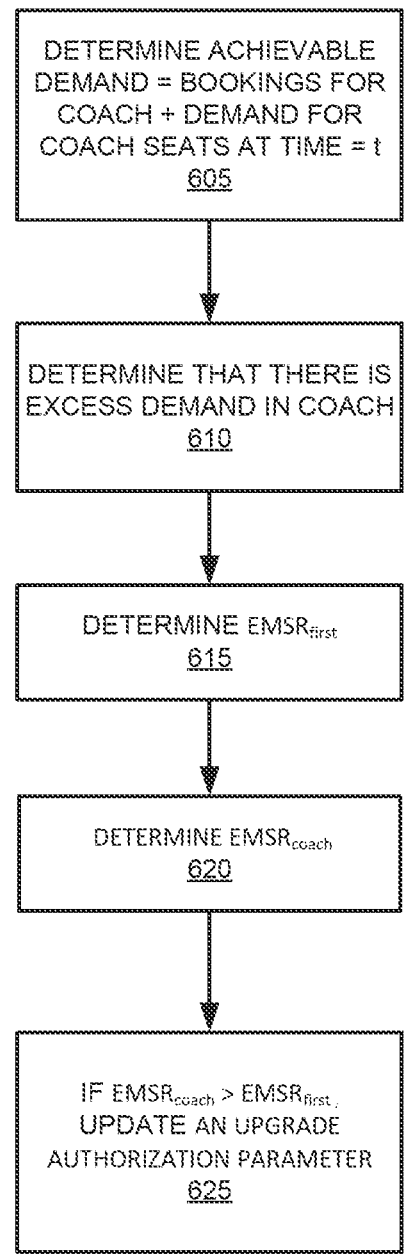
Figure 6 – Upgrade Solution

METHOD TO GENERATE PREDICTED VARIANCES OF AN OPERATION BASED ON DATA FROM ONE OR MORE CONNECTED DATABASES

CROSS-REFERENCE TO RELATED APPLICATIONS

This application is a continuation of, and claims priority to and the benefit of, U.S. patent application Ser. No. 17/945,848 filed on Sep. 15, 2022. The '848 application is a continuation of, and claims priority to and the benefit of, U.S. patent application Ser. No. 16/907,623 filed on Jun. 22, 2020. The '623 is a continuation of, and claims priority to and the benefit of, U.S. patent application Ser. No. 15/812,723 filed on Nov. 14, 2017. The '723 is a continuation of, and claims priority to and the benefit of, U.S. patent application Ser. No. 15/695,446 filed Sep. 5, 2017. The '446 application is a continuation of, claims priority to and the benefit of, U.S. patent application Ser. No. 14/038,278 filed Sep. 26, 2013. The '278 application is a continuation of, and claims priority to and the benefit of, U.S. patent application Ser. No. 13/352,667 filed on Jan. 18, 2012 aka U.S. Pat. No. 8,600,787 which issued on Dec. 3, 2013. The '667 application is a continuation of, claims priority to and the benefit of, U.S. patent application Ser. No. 13/348,417 filed on Jan. 11, 2012. The '417 application claims priority to and the benefit of, U.S. Provisional Application No. 61/561,245 filed on Nov. 17, 2011. Each of the aforementioned applications are hereby incorporated by reference in their entirety.

FIELD OF DISCLOSURE

The present disclosure generally relates to a revenue maximization system, and more particularly, to enabling forecasting and analysis methods and tools used as input to inventory control and revenue management systems.

BACKGROUND

The transportation services industry, and particularly the airline industry, is often associated with high costs and varying degrees of profitability. As a result, airlines often seek new sources of income (e.g., ala carte pricing for additional services) and innovative ways to increase revenues (e.g., optimizing existing processes). One such method of increasing revenues involves offering for sale a greater number of seats for any particular flight than is actually available on the flight. Such a strategy of authorizing more seats to be sold than there exists in inventory is often referred to as an "overbooking" strategy.

Most airlines overbook because some passengers holding a confirmed reservation will not show up for the flight ("no-show"), and the resulting empty seats represent foregone revenue opportunity for the airline. Traditional overbooking strategies have proven to be effective in generating increasing revenue, reducing costs and generally improving overall operational efficiencies for airlines. However, traditional overbooking optimization methods and systems often employ broad estimating techniques that produce only marginally accurate passenger no-show forecast and cost data. Thus, a long-felt need exists to provide a robust, model driven, sophisticated and customizable revenue maximization, cost forecasting and overbooking management system to enable accurate, timely and revenue maximizing data to the airline operation.

An overbooking strategy for a flight is accomplished by forecasting no-show rates, and then selling (i.e., overbooking) at a level that minimizes costs associated with operating a flight with empty seats, while also minimizing the expected total costs of overbooking. In other words, overbooking costs include not only the revenue opportunity cost of a flight with empty seats (spoiled seat ("SS") costs), but also costs associated with denying a passenger boarding on a flight due to overbooking denied boarding ("DB") costs. DB costs are incurred when more passengers show up than there are seats to accommodate them, and the airline has to compensate such denied passengers with, for example, vouchers (e.g., for a discount off of future travel) and/or cash payments (which may be established by law or regulation). Another cost associated with denying a passenger boarding is "ill-will," which can be thought of as the opposite of good will, wherein accrues to the airline and/or the airline's brand due to denied boardings.

SUMMARY

The present disclosure provides a forecasting and/or overbooking management system that maximizes revenue ("MARS"), as disclosed in various embodiments. MARS takes both the forecast of expected no-shows and the expected costs into account in formulating an overbooking strategy.

In various embodiments, MARS may be configured to minimize costs associated with the number of seats authorized to be sold for an airline flight. MARS determines an SS cost for each seat in a plurality of seats associated with a flight, where the SS cost may be, for example, based upon a current selling class of the flight and historic average fares associated with the flight. MARS determines a denied boarding cost for the flight. In various embodiments, the denied boarding cost is based upon any subset or all of a wide variety of factors, including: a non-compensation factor, a voucher amount, a voucher breakage factor, an expected percentage of volunteers, an factor, compensation associated with involuntary denied boarding (e.g., cash payment or a "draft"), an expected accommodations cost for the denied passenger (e.g., hotel, meal, local transport, etc.), and/or a double denied boarding factor (e.g., the ripple effect on inventory due to reaccommodating the denied passenger on a future flight).

In minimizing the costs associated with overbooking airline seats, MARS determines a booked passenger no-show forecast ("NSF") for each booked passenger associated with the flight. In various embodiments, the NSF is based upon the complete passenger itinerary of each respective passenger, data indicating whether the respective passenger flew on a previous leg of the passenger itinerary, and an adjustment factor based upon historical NSF data. MARS determines a flight NSF by aggregating the booked passenger NSF and an unbooked passenger NSF.

In various embodiments, MARS determines an authorized seat allocation for a flight by minimizing an overbooking cost based upon a cumulative spoiled seat cost, a cumulative denied boarding cost and the flight NSF. In various embodiments, MARS updates data (e.g., an authorization parameter) associated with the flight based upon the authorized seat allocation. A reservation system and/or a revenue management system uses the authorization parameter to determine a number of additional seats to be sold for the flight and/or a price for each respective additional seat.

In various embodiments, MARS calculates a flight authorization level ("AU") that minimizes an overbooking cost associated with the flight, the flight with a coach seating capacity ("CAP"), wherein the overbooking cost is based upon a spoiled seat SS cost and a denied boarding (DB) cost, and wherein minimizing overbooking cost with respect to AU may be determined by:

$$\sum_{n=0}^{\mu+3\sigma} P(x=n) \times [SSCost_n + DBCost_n]$$

where: $x$ = #no show for a flight $SSCost_n = SSCost(\max[n - (AU - CAP), 0])$ $DBCost_n = DBCost(\max[(AU - CAP) - n, 0])$ $x \sim \text{Binomial}(AU, p = \text{"No-Show-Rate"})$ $P(x = n) \equiv \binom{AU}{n} p^n (1-p)^{(AU-n)}$ $\mu = AU \times p$ $\sigma = \sqrt{AU \times p \times (1-p)}$ wherein $DBcost_n$ is associated with the DB cost of the $n^{th}$ passenger that is denied boarding and is determined by DB $cost_n = DDB_n * [(1-ncf)*(voucher\_amt*b*pv_n+(ill\_will+exp\_invol\_cost_n)*(1-pv_n)+HMT_n)]$, where ncf=no compensation factor=the percentage of passengers denied boarding that do not qualify to be compensated, voucher_amt=an amount of a voucher offered to passengers who volunteer to DB, b: Breakage factor, the expected percentage of voucher dollars that will be used, $pv_n$: given n passengers who are denied boarding to the flight, $pv_n$ is the expected percentage of volunteers;

ill_will: Extra cost added due to bad customer image and possible loss of customers due to involuntarily denying boarding to passengers;

exp_invol_cost$_n$: an expected payout to an involuntary DB passenger;

$HMT_n$=an expected accommodation cost of the $n^{th}$ DB passenger;

$DDB_n$=a double DB factor.

In various embodiments, the system may be configured to optimize AU based upon at least one of:

$HMT_n$ is not offered to voluntary DB passengers such that $HMT_n$ is reduced by multiplying by the expected percentage of involuntary passengers $(1-pv_n)$;

$DDB_n$ is based on the probability that $DB_n$ causes a ripple effect DB, wherein the ripple effect DB is associated with a DB on a different flight; and $DDB_n$ is based on an expected cost of reaccommodating the ripple effect DB.

In various embodiments, MARS calculates AUs for each scheduled flight in the airline network. The calculating of the AUs for each flight in the airline network may be executed, for example, on a daily basis. The periodic calculation of AU may be based upon updated data associated with at least one of the voucher_amt, $HMT_n$, $DDB_n$ and market load factors. The periodic calculation of AU may be based upon updated input data to the $SScost_n$ such as an update of a current selling class for each flight and updated market load factors.

BRIEF DESCRIPTION OF THE DRAWINGS

A more complete understanding of the present disclosure may be derived by referring to the detailed description and claims when considered in connection with the Figures, wherein like reference numbers refer to similar elements throughout the Figures, and:

FIG. 2 is a process flow diagram showing a process for determining a flight authorization level that minimizes overbooking costs, in accordance with various embodiments;

FIG. 3 is a process flow diagram showing a process for determining flight NSF, in accordance with various embodiments;

FIG. 5 is a process flow diagram showing a process for dynamically calculating costs, in accordance with various embodiments; and FIG. 6 is a process flow diagram showing a process for determining an upgrade solution, in accordance with various embodiments.

DETAILED DESCRIPTION

Figure 1:
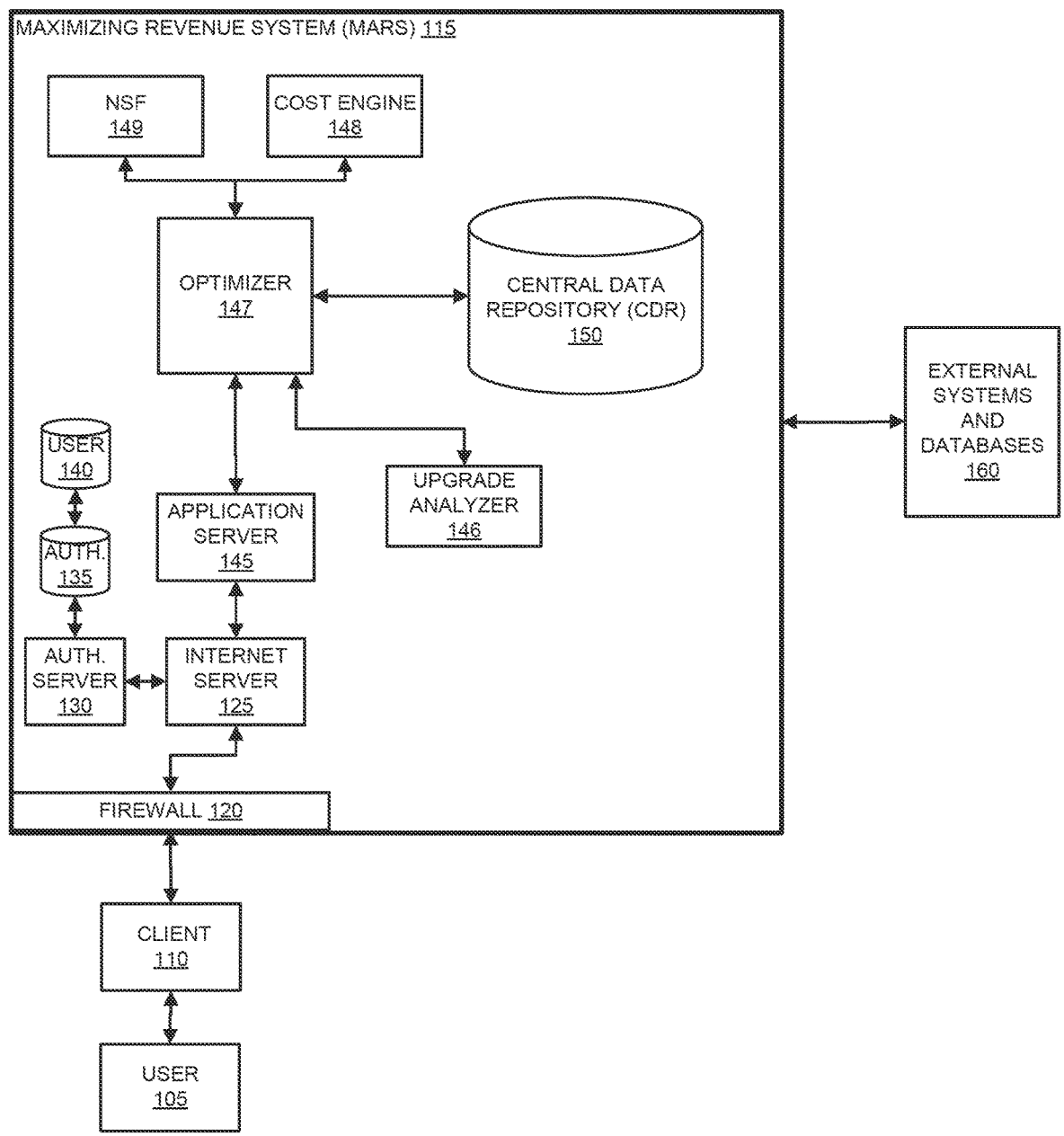
FIG. 1 is a block diagram illustrating major system components for forecasting and overbooking management, in accordance with various embodiments.

The present invention fundamentally changes the way organizations calculate and/or implement revenue maximization and/or cost minimization strategies. For example, MARS enables airlines to:

formulate more precise predictions regarding whether a particular passenger will show up for a particular leg (e.g., flight) of a passenger itinerary; such forecasts may be based upon a comprehensive analysis of itinerary data and taking into account data associated with previously flown legs, a next active leg and subsequently scheduled legs;

forecast costs associated with denying passengers boarding on a particular flight, for every flight each day, factoring in the actual passengers booked, market load factors, double denied boarding costs, hotel costs, and probability a denied boarding will result in a voucher or a cash payment;

dynamically calculate costs by analyzing re-accommodation dependencies;

forecast costs associated with an empty seat on a particular flight, individually for every flight each day, factoring in the current selling class and historic average fares;

implement a strategy that authorizes more seats to be sold in coach based upon seats in first class by calculating expected marginal seat revenue ("EMSR") for each first class seat and comparing it to an EMSR for each potential additional sale of a coach seat; in various embodiments, EMSR may be adjusted for the risk of double selling a unit of inventory (e.g., a seat);

implement just in time inventory and releasing additional seats for sale in the coach cabin based upon EMSR and coach cabin demand;

adjust, in near real time, for booking in first/envoy class cabin by, for example, decreasing the risk of double selling a seat (e.g., selling the same physical seat to two customers); and optimize voucher pricing (e.g., the value, often in the form of a credit, offered to passengers who voluntarily get "bumped" from a flight when the flight is overbooked).

While the disclosure may discuss airlines and "flights" for purposes of convenience and illustration, one of skill in the art will appreciate that the overbooking and revenue maximization method and tools discussed herein apply to any transportation industry; e.g., buses, cruise ships, passenger trains, etc.

Various embodiments of the present invention employ forecasting, statistical analysis and/or optimization techniques. For more information regarding such techniques refer to, for example: "The Theory and Practice of Revenue Management" (International Series in Operations Research & Management Science) by Kalyan T. Talluri and Garrett J. van Ryzin; "Using Multivariate Statistics (5th Edition)" by Barbara G. Tabachnick and Linda S. Fidell; and "Introduction to Operations Research" by Friedrich S. Hiller and Gerald J. Lieberman, McGraw-Hill 7th edition, Mar. 22, 2002; the contents of which are each hereby incorporated by reference in their entireties.

While the embodiments described herein are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent functional relationships and/or physical couplings between the various elements. It should be noted that many alternative or additional functional relationships or physical connections may be present in a practical system.

In various embodiments, MARS includes a user interface ("UI"), software modules, logic engines, numerous databases, interfaces to systems and tools, and/or computer networks. While MARS may contemplate upgrades or reconfigurations of existing processing systems, changes to existing databases and system tools are not necessarily required by the present invention.

The benefits provided by this disclosure include, for example, increased revenue, increased forecasting accuracy, lower costs, increased seat utilization, increased customer good will, increased planning and operational efficiency and increased employee morale. For example, a revenue management organization benefits from increased accuracy in setting inventory levels and predicting costs. Customers benefit from a more detailed and sophisticated double booking management strategy that minimizes the number of involuntary boarding denials.

While the description references specific technologies, system architectures and data management techniques, practitioners will appreciate that this description is but various embodiments and that other devices and/or methods may be implemented without departing from the scope of the invention. Similarly, while the description references a user interfacing with the system via a computer user interface, practitioners will appreciate that other interfaces may include mobile devices, kiosks and handheld devices such as mobile phones, smart phones, tablet computing devices, etc.

"Entity" may include any individual, software program, business, organization, government entity, web site, system, hardware, and/or any other entity.

A "user" may include any entity that interacts with a system and/or participates in a process. With reference to FIG. 1, user 105 may perform tasks such as requesting, retrieving, receiving, updating, analyzing and/or modifying data, initiating, manipulating, interacting with or using a software application, tool, module or hardware, and initiating, receiving or sending a communication. User 105 may interface with Internet server 125 via any communication protocol, device or method discussed herein, known in the art, or later developed. User 105 may be, for example, a member of a revenue management organization, a member of an operations research and systems analysis organization, a downstream system, a third-party system, a system administrator, etc.

In various embodiments, with reference to FIG. 1, system 101 may include a user 105 interfacing with a MARS 115 by way of a client 110. MARS 115 may be a partially or fully integrated system comprised of various subsystems, modules and databases. Client 110 comprises any hardware and/or software suitably configured to facilitate entering, accessing, requesting, retrieving, updating, analyzing and/or modifying data. The data may include operational data (e.g., schedules, resources, routes, operational alerts, weather, etc.), passenger data, cost data, forecasts, historical data, verification data, asset (e.g., airplane) data, inventory (e.g., airplane seat) data, legal/regulatory data, authentication data, demographic data, transaction data, or any information discussed herein.

Client 110 includes any device (e.g., a computer), which communicates, in any manner discussed herein, with the MARS 115 via any network discussed herein. Browser applications comprise Internet browsing software installed within a computing unit or system to conduct online communications and transactions. These computing units or systems may take the form of personal computers, mobile phones, personal digital assistants, mobile email devices, laptops, notebooks, hand-held computers, portable computers, kiosks, and/or the like. Practitioners will appreciate that client 110 may or may not be in direct contact with the MARS 115. For example, client 110 may access the services of MARS 115 through another server, which may have a direct or indirect connection to Internet server 125. Practitioners will further recognize that client 110 may present interfaces associated with a software application (e.g., SAS analytic software) or module that are provided to client 110 via application GUIs or other interfaces and are not necessarily associated with or dependent upon internet browsers or internet specific protocols.

User 105 may communicate with the MARS 115 through a firewall 120 to help ensure the integrity of the MARS 115 components. Internet server 125 may include any hardware and/or software suitably configured to facilitate communications between the client 110 and one or more MARS 115 components.

Firewall 120, as used herein, may comprise any hardware and/or software suitably configured to protect MARS 115 components from users of other networks. Firewall 120 may reside in varying configurations including stateful inspection, proxy based and packet filtering, among others. Firewall 120 may be integrated as software within Internet server 125, any other system 101 component, or may reside within another computing device or may take the form of a standalone hardware component.

Authentication server 130 may include any hardware and/or software suitably configured to receive authentication credentials, encrypt and decrypt credentials, authenticate credentials, and/or grant access rights according to predefined privileges associated with the credentials. Authentication server 130 may grant varying degrees of application and data level access to users based on information stored within authentication database 135 and user database 140. Application server 145 may include any hardware and/or software suitably configured to serve applications and data to a connected client 110.

According to various embodiments, MARS 115 is used to maximize revenue and/or manage inventory strategy, such as an airline seat overbooking strategy. With reference again to FIG. 1, MARS 115 allows communication with CDR 150 and with various other databases, tools, UIs and systems (not shown in FIG. 1). Such systems include, for example, airline scheduling systems, passenger booking and reservations systems, revenue management systems and inventory systems.

MARS 115 components are interconnected and communicate with one another to allow for a completely integrated revenue maximization and overbooking management, forecasting and inventory management system. In various embodiments, MARS 115 communicates with external systems and databases 160 to, for example, share results and other data. For example, in embodiments of the system, MARS 115 formulates passenger show rate (or no-show rate) and cost prediction models, and airline reservations systems (external Systems and databases 160) sell inventory based upon the MARS 115 output.

MARS 115 modules (e.g., upgrade analyzer 146, Optimizer 147, Cost Engine 148, no-show forecaster ("NSF") 149 and other MARS 115 modules not shown in FIG. 1) are software modules configured to enable online functions such as sending and receiving messages, receiving query requests, configuring responses, dynamically configuring user interfaces, requesting data, receiving data, displaying data, executing complex processes, calculations, forecasts, mathematical techniques, workflows and/or algorithms, prompting user 105, verifying user responses, authenticating the user, initiating MARS 115 processes, initiating other software modules, triggering downstream systems and processes, encrypting and decrypting. Additionally, MARS 115 modules may include any hardware and/or software suitably configured to receive requests from client 110 via Internet server 125 and application server 145.

MARS 115 modules may be further configured to process requests, execute transactions, construct database queries, and/or execute queries against databases, within system 101 (e.g., central data repository ("CDR") 150), external data sources and temporary databases. In various embodiments, one or more MARS 115 modules may be configured to execute application programming interfaces in order to communicate with a variety of messaging platforms such as, for instance, email systems, wireless communications systems, mobile communications systems, multimedia messaging service ("MMS") systems, short messaging service ("SMS") systems, and the like.

MARS 115 modules may be configured to exchange data with other systems and application modules, such as, for example an airline reservation system. In various embodiments, MARS 115 modules may be configured to interact with other system 101 components to perform complex calculations, retrieve additional data, format data into reports, create XML representations of data, construct markup language documents, construct, define or control UIs, and/or the like. Moreover, MARS 115 modules may reside as stand-alone systems or tools or may be incorporated with the application server 145 or any other MARS 115 component as program code. As one of ordinary skill in the art will appreciate, MARS 115 modules may be logically or physically divided into various subcomponents such as a workflow engine configured to evaluate predefined rules and to automate processes.

In addition to the components described above, MARS 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more system 101 components may be embodied as a customization of an existing system, an add-on product, upgraded software, a stand-alone system (e.g., kiosk), a distributed system, a method, a data processing system, a device for data processing, and/or a computer program product. Accordingly, individual system 101 components may take the form of an entirely software embodiment, an entirely hardware embodiment, or an embodiment combining aspects of both software and hardware. Furthermore, individual system 101 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Client 110 may include an operating system (e.g., Windows XP, Windows NT, 95/98/2000, Windows 7, Vista, OS2, UNIX, Linux, Solaris, MacOS, Windows Mobile OS, Windows CE, Palm OS, Symbian OS, Blackberry OS, J2ME, etc.) as well as various conventional support software and drivers typically associated with mobile devices and/or computers. Client 110 may be in any environment with access to any network, including both wireless and wired network connections. In various embodiments, access is through a network or the Internet through a commercially available web-browser software package. Client 110 and MARS 115 components may be independently, separately or collectively suitably coupled to the network via data links which include, for example, a connection to an Internet Service Provider ("ISP") over the local loop as is typically used in connection with standard wireless communications networks and/or methods, modem communication, cable modem, Dish networks, ISDN, Digital Subscriber Line ("DSL"). In various embodiments, any portion of client 110 may be partially or fully connected to a network using a wired ("hard wire") connection. As those skilled in the art will appreciate, client 110 and/or any of the system components may include wired and/or wireless portions.

Internet server 125 may be configured to transmit data to client 110 within markup language documents. "Data" may include encompassing information such as commands, messages, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users (such as user 105). In various embodiments, the Microsoft Internet Information Server ("IIS"), Microsoft Transaction Server ("MTS"), and Microsoft SQL Server, are used in conjunction with the Microsoft operating system, Microsoft NT web server software, a Microsoft SQL Server database system, and a Microsoft Commerce Server. In various embodiments, Linux, Apache, Informix MySQL and PHP hypertext processor are used to enable MARS 115. Additionally, components such as Access or Microsoft SQL Server, Oracle, Sybase, InterBase, etc., may be used to provide an Active Data Object ("ADO") compliant database management system.

Like Internet server 125, application server 145 may communicate with any number of other servers, databases and/or components through any means known in the art. Further, application server 145 may serve as a conduit between client 110 and the various systems and components of MARS 115. Internet server 125 may interface with application server 145 through any means known in the art including a LAN/WAN, for example. Application server 145 may further invoke software modules such as the Optimizer 147, automatically or in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages ("ASP"), common gateway interface scripts ("CGI"), Flash files or modules, FLEX, ActionScript, extensible markup language ("XML"), dynamic HTML, cascading style sheets ("CSS"), helper applications, plug-ins, and/or the like. A server may include a web service that receives a request from a web server, the request including a URL (e.g., http://yahoo.com/) and an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003).

FIG. 1 depicts databases that are included in various embodiments of the invention. An exemplary list of various databases used herein includes: an authentication database 135, a user database 140, CDR 150 and/or other databases that aid in the functioning of the system. As practitioners will appreciate, while depicted as separate and/or independent entities for the purposes of illustration, databases residing within system 101 may represent multiple hardware, software, database, data structure and networking components. Furthermore, embodiments are not limited to the databases described herein, nor do embodiments necessarily utilize each of the disclosed databases.

Authentication database 135 may store information used in the authentication process such as, for example, user identifiers, passwords, access privileges, user preferences, user statistics, and the like. User database 140 maintains user information and credentials for MARS 115 users (e.g., user 105).

CDR 150 is a data repository that may be configured to store a wide variety of comprehensive data for MARS 115. While depicted as a single logical entity in FIG. 1, those of skill in the art will appreciate that CDR 150 may, in various embodiments, consist of multiple physical and/or logical data sources. In various embodiments, CDR 150 stores operational data, schedules, resource data, asset data, inventory data, personnel information, routes and route plans, station (e.g., airports or other terminals) data, operational alert data, weather information, passenger data, reservation data, cost data, optimization results, booking class data, forecasts, historical data, verification data, authentication data, demographic data, legal data, regulatory data, transaction data, security profiles, access rules, content analysis rules, audit records, predefined rules, process definitions, financial data, and the like. For example, a data source or component database of CDR 150 includes passenger name record ("PNR") data for an airline, historical voluntary voucher cost information, historical show rates for markets and/or market segments and for particular passenger attributes, route and schedule data, airline equipment characteristics, pricing data, etc.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of system 101 may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, Flash, ActionScript, FLEX, VBScript, Macromedia Cold Fusion, COBOL, Microsoft Active Server Pages, assembly, PERL, SAS, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VB Script or the like.

Software elements may be loaded onto a general purpose computer, special purpose computer, or other programmable data processing apparatus to produce a machine, such that the instructions that execute on the computer or other programmable data processing means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified herein or in flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Referring again to FIG. 1, in various embodiments, user 105 logs onto an application (e.g., a module) and Internet server 125 may invoke an application server 145. Application server 145 invokes logic in the MARS 115 modules by passing parameters relating to user's 105 requests for data. MARS 115 manages requests for data from MARS 115 modules and/or communicates with system 101 components. Transmissions between user 105 and Internet server 125 may pass through a firewall 120 to help ensure the integrity of MARS 115 components. Practitioners will appreciate that the invention may incorporate any number of security schemes or none at all. In various embodiments, Internet server 125 receives requests from client 110 and interacts with various other system 101 components to perform tasks related to requests from client 110.

Internet server 125 may invoke an authentication server 130 to verify the identity of user 105 and assign roles, access rights and/or permissions to user 105. In order to control access to the application server 145 or any other component of MARS 115, Internet server 125 may invoke an authentication server 130 in response to user 105 submissions of authentication credentials received at Internet server 125. When a request to access system 101 is received from Internet server 125, Internet server 125 determines if authentication is required and transmits a prompt to client 110. User 105 enters authentication data at client 110, which transmits the authentication data to Internet server 125. Internet server 125 passes the authentication data to authentication server 145 which queries the user database 140 for corresponding credentials. When user 105 is authenticated, user 105 may access various applications and their corresponding data sources.

With reference again to FIG. 1, in various embodiments, an optimizer module (e.g., Optimizer 147) receives input from a forecaster module (e.g., NSF 149) and one or more cost forecaster and analysis engines (e.g., Cost Engine 148). The optimizer module determines an optimal booking allocation (aka "authorization level" or "AU") for an airline flight. In various embodiments, upgrade analyzer 146 receives a first AU calculation and calculates an upgrade adjusted AU based upon an EMSR calculation.

With reference now to FIG. 2, a process for determining the AU that minimizes overbooking costs is shown. Cost Engine 148 forecasts a spoiled seat ("SS") cost for each seat in a plurality of seats associated with a flight (Step 205). In various embodiments, the SS cost is based upon at least one of a current selling class of the flight and historic fares associated with the flight.

Cost Engine 148 forecasts a denied boarding ("DB") cost for the flight (Step 210). In various embodiments, forecasting the DB cost includes assessing the probability that each DB passenger will volunteer to not take the flight or that the passenger with be denied boarding involuntarily.

NSF 149 determines a booked passenger no-show forecast ("NSF") for each passenger associated with the flight (Step 215). In various embodiments, the booked passenger NSF is based upon a subset of the booked passenger associated with the flight. In various embodiments, the booked passenger NSF is based upon the next active leg of a passenger's itinerary. The next active leg may not correspond to the flight that is being analyzed.

NSF 149 aggregates the booked passenger NSF and an unbooked passenger NSF to create a flight NSF (Step 220). Optimizer 147 determines an authorized seat allocation for the flight that minimizes an overbooking cost, where the overbooking cost is based upon an accumulation of each SS cost, the DB cost and the flight NSF (Step 225).

MARS 115 updates an authorization parameter for the flight based upon the AU (Step 230). In various embodiments, the authorization parameter is obtained, received and/or accessed by a reservation system and/or revenue management system that uses the AU to determine a number of additional seats to be sold for the flight and a respective price for each additional seat.

No-show Forecast ("NSF")

In various embodiments, NSF 149 may be configured to forecast a no-show rate for every passenger booked in a flight using their passenger name record ("PNR") characteristics. NSF 149 determines the likelihood that a particular passenger will show up for a flight based upon traditional factors such as passenger demographics, historic no-show data from similar flights, etc. Additionally, in various embodiments, NSF 149 performs a comprehensive analysis of itinerary data for each particular passenger in determining the show rate (aka the no-show-forecast or "NSF").

NSF is based upon and, in various embodiments, proportional to a no-show rate; the terms NSF and no-show rate may be used interchangeably herein. "No-show rate" may be thought of as the complement of the probability of show, i.e., 1−NSF=probability of show. PNR characteristics include data stored, collected or accessible by airlines such as: outbound origin type indicator, local/flow indicator, frequent flyer status, offline OA indicator, e-ticket indicator, time of day, advanced purchase range, refundability indicator, service class, day of week, multiple passenger in itinerary, next active leg, outbound vs. return, number of legs being traveled, order of the flight under analysis with other legs in the itinerary, etc.

In various embodiments, CDR 150 includes historical PNR data and historical show rate data. Historical show rate data is analyzed by directional markets and/or regions and may also be analyzed by PNR characteristic. "Directional Market" includes a flight in one direction between one particular point and another. Thus, Boston to Reagan Washington (BOS →DCA) is considered a different directional market than Reagan Washington to Boston (DCA→BOS).

In various embodiments, NSF 149 comprises a historical data processing engine that applies various statistical methods to historical PNR data in order to generate forecast coefficients based on historical show rates for various market and passenger characteristics and combinations of characteristics. Such statistical methods include, for example, regression techniques such as logistic regression. Thus, in various embodiments, determining an NSF for a particular passenger comprises determining the forecast market for the passenger and aggregating the appropriate forecast coefficients associated with historical passenger data with similar PNR characteristics.

With reference now to FIG. 3, a process for determining flight NSF in various embodiments is shown. NSF 149 determines a NSF for each booked passenger of the flight and aggregates the individual booked passenger NSF's into a flight level booked passenger NSF. In various embodiments, for the booked passenger NSF, NSF 149 accesses PNR data for the flight being analyzed from CDR 150 (Step 305). NSF 149 analyzes the PNR data and, for each passenger booked on the flight, determines the next active leg for the passenger. Based upon the next active leg, NSF 149 assigns a forecast market (Step 310). As discussed above, in various embodiments, NSF 149 may analyze PNR data for a subset of booked passengers.

Based upon the forecast market and PNR characteristics, NSF 149 retrieves NSF coefficients for the passenger (Step 315). For instance, NSF 149 may determine that the forecast market is Washington, D.C. to Phoenix, Ariz. (DCA→PHX) and that the passenger is an outbound passenger, without other passengers on his itinerary and the ticket was purchased for the flight in the 14-21 day AP range. In various embodiments, NSF 149 retrieves forecast coefficients from the forecast market data area (e.g. table/row/column) of CDR 150 and NSF 149 aggregates the various forecast coefficients to determine a show rate (or NSF) to associate with the passenger.

In various embodiments, default rules may determine how to handle NSF data that is incomplete, missing, outside of expected bounds, etc. For instance, NSF 149 may determine that forecast coefficient data for a particular forecast market is based upon a sample size that is too small to be statistically significant and, for example, apply a default rule that directs NSF 149 to use unbooked NSF data in place of the booked passenger historical NSF data (Step 320). Other default rules may direct NSF 149 to use a predetermined value assigned to the forecast market (Step 325). Default rules may be nested, cumulative, stored in code (hard coded), stored in a database and/or derived based upon conditions such as time of year, day of week, etc.

NSF 149 aggregates the individual booked passenger NSFs to determine a booked passenger NSF for the flight (Step 330). In various embodiments, NSF 149 may apply an adjustment to the booked passenger NSF (Step 335) to, for example, ensure that the booked passenger NSF for the flight is within certain upper and lower bounds. Such upper and lower bounds may be stored, calculated or derived and may be based upon statistical analysis, the experience or intuition of experts, etc.

NSF 149 determines an unbooked passenger NSF for the flight. In various embodiments, a historical show rate by directional market based on booking period is used to predict a show rate to associate with unbooked seats of the flight. Unbooked seats are the seats yet to be reserved by a passenger. Unbooked NSF may be based upon historical averages and as a function of time. The function of time may represent the booking period as designated by the days before a flight is scheduled to depart. Booking period may be referred to as the advanced purchase (AP) timeframe. AP is a typical term in the airline industry and many airline rate structures are based upon AP with rate restrictions associated with a particular AP.

Thus, for example, a reference table in CDR 150 may store a historical show rate for passengers who booked a flight at a given AP and/or inside of a given date before a flight. For example, for a directional market x→y, the show rate might be .85 for the +60 AP, .90 for the +30 AP and .97 for the seven day AP. The reference table may store information at the directional market level. In various embodiments, some directional markets may not have data comprehensive enough upon which to base show rate or NSF forecasts. NSF 149 may use market segment data in the case where specific directional market data is inadequate (e.g., insufficient, missing, known to be inaccurate, etc.).

With reference again to FIG. 3, NSF 149 determines the days until departure of the flight that is being analyzed (Step 340) and determines a directional market associated with a flight. NSF 149 accesses unbooked passenger historical data based upon the days until departure and the directional market and determines an unbooked passenger NSF (Step 345). In various embodiments, default rules may determine how to handle unbooked passenger NSF data that may be, for example, missing, incomplete, outside of expected bounds or variances, etc. For instance, NSF 149 may determine that the unbooked NSF data for a particular directional market and timeframe is incomplete and, for example, apply a default rule that directs NSF 149 to use unbooked NSF data for a market group associated with the directional market (Step 350). For example, if the data for Cedar Rapids→Chicago is incomplete, the default rule may direct NSF 149 to use Des Moines→Chicago data, or the default rule may direct NSF 149 to use Iowa (aggregated)→Chicago data. Other default rules may direct NSF 149 to use a predetermined value for the market (Step 355). Default rules for determining unbooked passenger NSF may be nested, may be stored in code (hard coded), in a database and/or derived based upon conditions such as time of year, day of week, etc.

In various embodiments, the number of unbooked seats associated with the flight at any given time is calculated based on an AU of the flight less the number of bookings (i.e., booked/sold tickets): #Unbooked Seats=(Capacity—#Booked Passengers*(Booked Show Rate))/(Unbooked Show Rate).

In various embodiments, the booked passenger NSF may be aggregated with an unbooked seat NSF to determine a flight NSF (Step 360). NSF 149 may apply an adjustment to the flight NSF in order to, for example, ensure that the flight NSF is within certain bounds (Step 365). For example, in various embodiments, flight show rates are bounded by finding Q1-1.5*(Q3-Q1) of the historical show rates of flights at the market level, where Q1=25th percentile and Q3=75th percentile.

Next Active Leg

As discussed above, in various embodiments, NSF 149 determines an NSF (or probability of show) based on historic show rates for the next active leg ("NAL") in the passenger itinerary. In various embodiments, based upon the itinerary data, NSF 149 determines a historic show rate of passengers with similar characteristics and identical or similar (e.g., same start and end points plus similar departure time or day of week) NAL of a passenger's itinerary.

Traditional systems and methods for forecasting whether a booked passenger will show for a flight typically do not differentiate between passengers based upon their itinerary. For example, consider a flight from Washington, D.C. (DCA) to Boston, Mass. (BOS) where passenger 1 and passenger 2 are both booked passengers for the flight. NSF 149 may predict an NSF for passenger 1 and passenger 2 based upon historical directional market data and passenger profile data (class of service booked, how far in advance the ticket was purchased, etc.). In various embodiments, NSF 149 determines a passenger NSF for a particular flight based, at least partially, upon the NAL for the passenger.

For example, if passenger 1's itinerary comprises one leg (DCA→BOS) and passenger 2's itinerary comprises two legs (PHX→DCA and DCA→BOS), NSF 149 analyzes the NSF for these passengers differently. In various embodiments, NSF 149 determines the NAL for each passenger. Since passenger 1 is only scheduled for one leg, passenger 1's NAL is the same flight as the flight that is under analysis, namely, DCA→BOS. NSF 149 determines the passenger forecast market to be the directional market of DCA→BOS. NSF 149 determines the NSF of passenger 1 based upon forecast coefficients associated with the DCA→BOS directional market.

In various embodiments, the forecast coefficients for a particular directional market may be determined in a variety of ways; for example, the forecast coefficient may be stored in a table and the table may be updated periodically (e.g., daily, weekly or monthly) based upon actual show/no-show data for particular passenger characteristics associated with the forecast market.

Continuing the above example, NSF 149 may determine Passenger 2's NSF as different from Passenger 1's NSF even if, for example, all other characteristics regarding the passengers were identical. Passenger 2 is scheduled to fly two legs so, in various embodiments, passenger 2's NSF for the flight being analyzed by NSF 149 depends upon passenger 2's NAL; i.e., whether passenger 2 has flown leg 1 (PHX→DCA), or not. In this example, if NSF 149 determines that passenger 2 has yet to fly leg 1, then NSF 149 determines the NAL for passenger 2 to be PHX→DCA, even though the flight being analyzed is DCA→BOS; in other words, since passenger 2 has yet to show for the first of a two-leg itinerary, NSF 149 uses the forecast coefficients based upon the first leg (i.e., the NAL), in determining passenger 2's NSF for the passenger's second leg. Thus, since passenger 2's NAL is PHX→DCA, NSF 149 uses PHX→DCA data to determine passenger 2's NSF for the DCA→BOS flight.

Continuing the same example, if NSF 149 determines that passenger 2 has already flown leg 1, then DCA→BOS is the NAL and NSF 149 assigns DCA→BOS as the forecast market for passenger 2 and determines forecast coefficients based upon DCA→BOS in assigning the passenger 2's NSF for the DCA→BOS flight. One of skill in the art will recognize that the above example merely illustrates embodiments and is not presented for purposes of limitation.

Outbound vs. Return

In various embodiments, when analyzing the booked passenger NSF for a particular flight, NSF 149 considers where the flight is with respect to the order of all the legs in the passenger itinerary. For example, NSF 149 may consider whether a passenger has flown a portion of the itinerary, is en route, or is on a return segment when forecasting the NSF for the particular passenger for the particular leg.

For example, consider a forecast for a flight from DCA→BOS. Passenger 1's itinerary comprises one leg: DCA→BOS. Passenger 2's itinerary comprises four legs: Outbound: Leg1-BOS→DCA; Leg2-DCA→PHX; Return: Leg3-PHX→DCA; Leg4-DCA→BOS. Assume that passenger 2 has already flown legs 1-3. In various embodiments, on the itineraries depicted in the example above, for the purpose of determining NSF, MARS 115 considers otherwise similar passengers as fundamentally different. This example illustrates two of the various considerations NSF 149 uses in forecasting a passenger NSF for a flight: "outbound vs. return" and "connecting flight." MARS 115, and specifically NSF 149, takes into consideration an outbound passenger's (e.g., itinerary 1 in the above example) probability of show is likely to be different than a passenger on an intermittent leg or a return portion of their trip (e.g. passenger 2 in the above example). Furthermore, in various embodiments, NSF 149 forecasts the NSF for passenger 1 and passenger 2 differently because passenger 2 is a connecting passenger (from PHX) and passenger 1 is an originating passenger. For example, in various embodiments, NSF 149 calculates the NSF for passenger 2's leg 4 as a joint probability (i.e., NSF for leg 4 depends upon passenger 2's NSF for leg 3) and/or a conditional probability (e.g., whether or not passenger 2 has already flown leg 3).

In addition to the methods discussed above, in various embodiments, NSF 149 may be configured to calculate NSF for particular passengers based upon one or more of the following methods or factors: NSF or market coefficient is at least partially determined using logistic regression; NSF for a passenger is determined based upon a previous leg flown and/or future scheduled legs; a feedback loop adjusts the forecasted booked show rate to account for errors in forecast (e.g. an experienced based adjustment factor is applied to the forecast); etc.

Cost Forecaster

Cost Engine 148 may be configured to forecast costs associated with overbooking. In various embodiments, MARS 115 enables forecasting DB costs and SS costs. If the AU is set too high, more passengers might show for a flight than there are seats on the airplane for the passengers. DB costs include all the costs associated with denying a passenger boarding on a flight. SS costs include all the costs associated with flying an airplane with an empty seat (e.g., the lost revenue associated with not selling enough tickets so that seat utilization is 100% on the flight).

Denied Boarding (DB) Costs

Several factors contribute to the cost associated with an airline denying a passenger boarding on a flight for which the passenger possesses a ticket. In various embodiments, Cost Engine 148 forecasts DB costs individually for every flight, each day, factoring in the actual passengers booked, market load factors, hotel costs, and probability a denied boarding will result in a voucher or a draft. The DB cost is calculated at the flight level and also takes into account the different accommodation options (e.g. hotel, meals and transportation) available.

Figure 4:
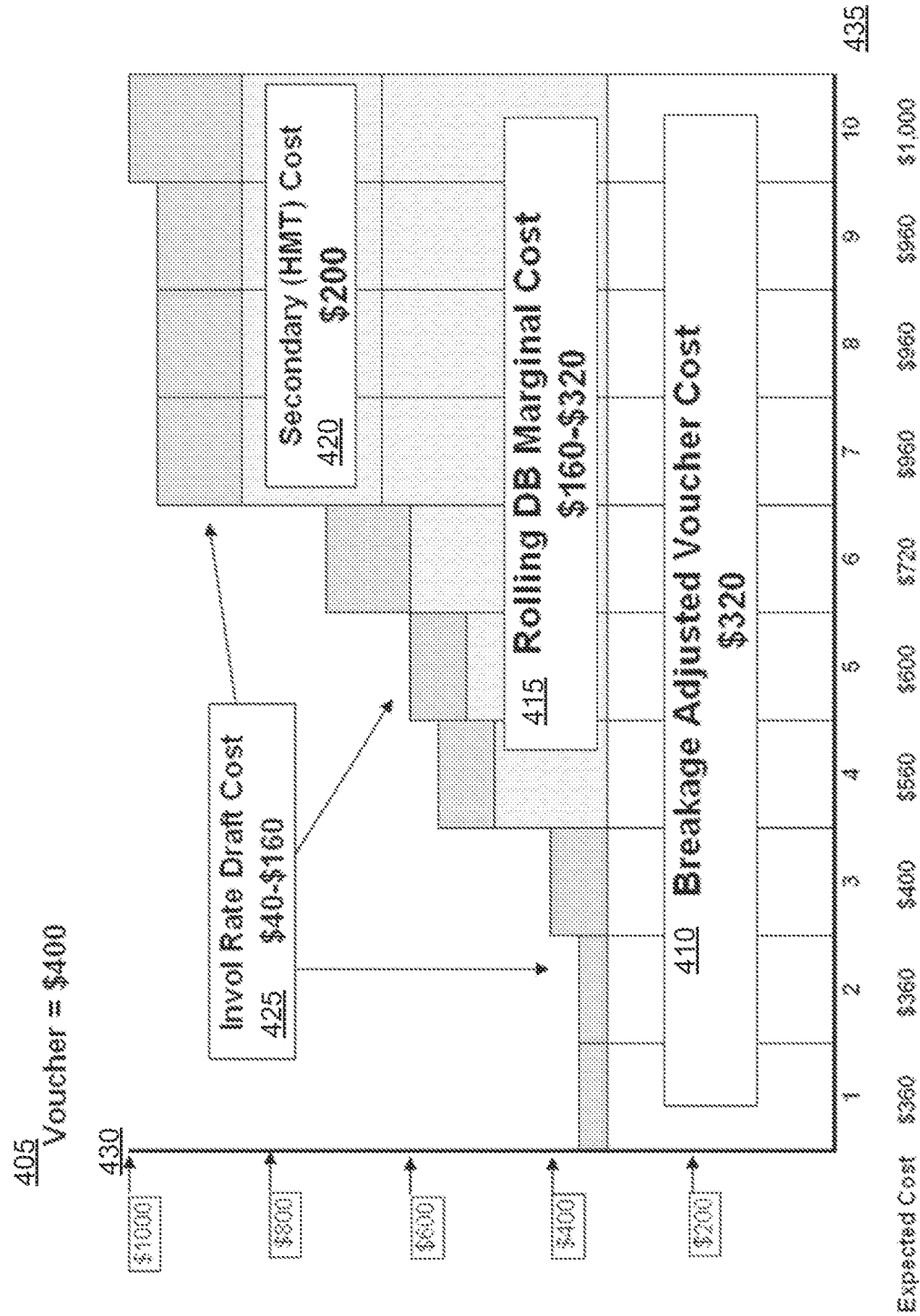
FIG. 4 is a graph showing an overbooking cost model in accordance with various embodiments.

FIG. 4 shows an example of calculating denied boarding cost given an exemplary voucher cost of $400 (405). The vertical axis (430) indicates the total expected cost and the horizontal axis (435) indicates the number of passengers denied boarding. In in various embodiments, denied boarding cost may be modeled as an aggregate, for each passenger denied boarding, of a breakage adjusted voucher cost (410), an involuntary rate draft cost (425), a rolling denied boarding marginal cost (i.e., double denied boarding costs) (415) and a secondary hotel, meal and transportation cost (420). In various embodiments, Cost Engine 148 takes into account an estimate that considers that not all vouchers issued by an airline will be redeemed by a passenger. Thus, gross voucher cost may be adjusted by a "breakage factor."

Cost Engine 148 may also consider the effect on future flights of a denied boarding of the current flight. Cost Engine 148 employs sophisticated data analysis and forecasting algorithms that are able to assess the cumulative effect, across the airline's entire network, of excess passengers in the system; e.g., the effect associated with passengers who may be denied boarding on a particular flight, rescheduled for a later flight and cause that later flight to deny boarding of a different passenger. As shown in FIG. 4, rolling DB marginal cost (415) takes this phenomenon into account.

In various embodiments, Cost Engine 148 determines the cost of each denied boarding passenger for a flight based upon the following:

DB $cost_i = DDB_i * [(1-ncf)*(voucher\_amt*b*pv_i+(ill\_will+exp\_invol\_cost_i)*(1-pv_i)+HMT_i)]$; where, DB $cost_i$: DB cost of the $i^{th}$ passenger who is denied boarding;

ncf. No Compensation Factor, the percentage of DBs that do not qualify to be compensated due to non-compliance, $0 \le ncf \le 1$;

voucher_amt: The actual amount of the voucher offered to passengers who volunteer to DB (i.e., voluntarily get "bumped" from the flight);

b: Breakage factor, the expected percentage of voucher dollars that will be used, $0 \le b \le 1$ (breakage factor can also be thought of as the voucher utilization factor);

$pv_i$: Given i DBs, $pv_i$ is the expected percentage of volunteers, calculated from a linear regression model using historical data, $0 \le pv \le 1$;

ill_will: The extra cost added due to bad customer image and possible loss of customers due to involuntarily denying boarding to passengers;

exp_invol_$cost_i$: The expected payout to an involuntary DB passenger;

$HMT_i$: The expected hotel, meal and transportations costs of the $i^{th}$ DB passenger, based on the time to accommodate the passenger; and, $DDB_i$: Double DB factor, increases the DB cost based on the probability that this DB causes another DB. $DDB_i$ increases depending on the load factor of an entire directional market and the station load factor for that day. $DDB_i \ge 1$.

MARS 115 also includes a voucher analysis and pricing module to reduce costs by minimizing both involuntary draft costs (i.e., payments to involuntary passengers that are denied boarding) and voucher outlays (i.e., vouchers given to passengers who voluntarily opt to not travel on a flight).

In various embodiments, MARS 115 evaluates flights occurring in a given timeframe (e.g., the next 24 hours) on an iterative basis (e.g., every 30 minutes) on the criteria used in the DB calculations. A flight may have low expected DB costs in the morning, but due to operational issues (cancellation, downgrade, weather, a political event) have much higher actual DB costs. Costs are minimized by adjusting the voucher offer for a particular flight throughout the day based on the most current conditions.

In various embodiments, MARS 115 calculates a plurality of AUs for, respectively, each scheduled flight in airline network. In response to calculating the plurality of AUs, Cost Engine 148 calculates, on a periodic basis the $DBcost_n$ for each flight scheduled for departure in the next x-number hours (e.g., x=24, a rolling 24 hour time period). In various embodiments, the periodic basis may be based upon a schedule (e.g., every 30 minutes) and/or may be based upon an operational factor such as, for example, to assess the impact of flight cancellations, weather, a political event (e.g., terrorism), an economic event, or a flight maintenance issue.

In various embodiments, MARS 115 determines a plurality of affected flights among flights scheduled for departure in the next twenty-four hours that are affected by an operational factor and adjusts an actual voucher offer amount for a subset of flights in the plurality of affected flights.

Dynamic Calculation of Re-accommodation Costs

In various embodiments, DB cost is dynamically calculated based upon a plurality of forecasts for a re-accommodation cost for each of a plurality of denied passengers for a flight. When passengers are DB for a flight, they are typically reaccommodated on a later flight. Predicting the costs associated with such re-accommodation can be complex since each reaccommodated passenger takes up a seat on a future flight which decreases the number of re-accommodation options available for the next DB passenger.

In various embodiments, Optimizer 147 and Cost Engine 148 work in conjunction with each other to dynamically determine the re-accommodation costs for a given DB passenger based upon re-accommodation options and taking into account re-accommodation options that may have been eliminated by other DB passengers. For example, the cost for a $3^{rd}$ DB passenger may depend on number of re-accommodation options and how the $1^{st}$ and $2^{nd}$ DB passenger were re-accommodated.

With reference now to FIG. 5, in various embodiments, when determining the DB Costs for a flight, Cost Engine 148 determines a re-accommodation cost for each possible number of DB passengers. Cost Engine 148 determines the forecasted number of denied passengers for the flight. The number of forecasted denied passengers for the flight may be based upon the CAP, the AU and/or the NSF for the flight.

Cost engine analyzes a plurality of flights in an airline network to identify a plurality of alternate accommodation (AA) flights that cover at least the same directional market as the flight (Step 505). Cost Engine 148 analyzes the booking information for each flight in the plurality of AA flights (Step 510). Cost Engine 148 selects a first AA flight for the first DB. For example, a flight is scheduled for Phoenix to Pittsburgh (PHX→PIT) on Day 1 at 12pm. Cost Engine 148 identifies the following AA flights:

AA$_1$:PHX→PIT on Day 1 at 4pm
AA$_2$:PHX→CLT→PIT on Day 1 at 5pm
AA$_3$:PHX→PIT on Day 1 at 8pm
AA$_4$:PHX→PIT on Day 2 at 7am
AA$_5$:PHX→CLT→PIT on Day 2 at 8am

In the above example, Cost Engine 148 may assign the first denied passenger to be reaccommodated on the first AA flight (DB$_1$:AA$_1$) and may determine that AA$_1$ can still accommodate more passengers and assign the second denied passenger to the same flight (DB$_2$:AA$_1$). However, based upon the re-accommodations DB$_1$ and DB$_2$ on AA$_1$, there may not be enough "room" on any AA flight for DB$_3$ until AA$_4$ on the next day. Thus, in determining the DB Costs for each DB, Cost Engine 148 may not include a hotel, meal and transportation (HMT) cost for DB$_1$ and DB$_2$ but may include an HMT as part of DBCost$_3$.

In various embodiments, Cost Engine 148 may also adjust the double DB factor component of a potential DB for a different flight. For example, if booking information suggests that re-accommodation of a 3$^{rd}$ DB passenger on AA$_4$ would influence the probability that passenger already booked on the AA$_4$ flight would now be denied boarding on that flight, Cost Engine 148 assesses this cost to the system and incorporates the DDB cost in DBCost$_3$.

With reference again to FIG. 5, Cost Engine 148 selects for a first denied passenger a first AA flight from the plurality of AA flights, wherein the first denied passenger is one of the plurality of denied passengers (Step 515). Based upon the selecting the first AA flight for the first denied passenger, Cost Engine 148 selects for a second denied passenger a second AA flight from the plurality of AA flights (Step 520). In response to the second AA flight being scheduled to depart on a different day than the flight (Step 525), Cost Engine 148 adjusts the DB cost associated with the second denied passenger to account for hotel, meal and/or transport (HMT) costs (Step 530).

Spoiled Seat (SS) Costs—SS Cost is the cost associated with a flight flying with an empty seat. Airlines typically consider empty seats on flights as revenue that may never be recaptured. In various embodiments, Cost Engine 148 forecasts SS costs based upon various factors such as the closure level for the flight, day of week, historical market average fares and advance purchase ("AP") range. "Closure level" means the lowest fare class for that flight. "AP Range" means the advanced purchase interval prior to a flight's actual day of departure. Since fares generally increase as a flight approaches the scheduled departure date, spoiled seat costs are generally more expensive a few days before the flight departs than a couple months before the flight departs. Thus, in various embodiments, Cost Engine 148 calculates SS costs based upon a time factor such as the AP range and/or the actual timeframe (e.g., number of days) before the flight is scheduled to depart.

Cost Engine 148, calculates a SS cost for each potential spoiled seat on a flight. The first SS for a flight (i.e., SS$_1$) can be thought of as the predicted value of selling one more seat on the plane. In various embodiments, Cost Engine 148 determines additional SS costs using an exponential decay function such as the exemplary function: SS$_i$=d$^{i-1}$SS$_{i-1}$, where 0<d<1 is calculated using historical fares by market and Advance Purchase.

Optimizer

In various embodiments, Optimizer 147 receives input from NSF 149 and Cost Engine 148 to determine an overbooking strategy for a flight. Given the no-show rate, Optimizer 147 evaluates the risk of denied boardings (DB cost) against missed revenue potential (SS Cost). In various embodiments, Optimizer 147 may employ a variety of statistical models and/or optimization methods in order to determine the optimal overbooking strategy. In various embodiments, Optimizer 147 assumes that the actual show rate follows a binomial distribution with an exemplary mathematical formulation as shown below:

$$\min\{E[\text{Overbooking Cost}]\}$$

$$\text{w.r.t to } AU$$

$$E[\text{Overbooking Cost}] =$$

$$\sum_{n=0}^{\mu+3\sigma} P(x=n) \times \begin{cases} SPCost(\max[n-(AU-CAP), 0]) \\ + \\ DBCost(\max[(AU-CAP)-n, 0]) \end{cases}$$

$$\text{subject to}: CAP \leq AU \leq 1.12 \times CAP$$

$$\text{where}: n \sim \text{Binomial}(AU, p = \text{No Show Rate})$$

$$P(x=n) \equiv \binom{AU}{n} p^n (1-p)^{AU-n}$$

$$\mu = AU \times p, \ \sigma = \sqrt{AU \times p \times (1-p)}$$

Thus, the optimal AU is determined as the AU that minimizes expected overbooking costs and the expected overbooking cost is calculated as a summation of overbooking costs across a show rate distribution; i.e., P(x=n) is determined based upon a statistical distribution (binomial) that depends on a historical no-show rate.

In order to illustrate the embodiment shown in the above equation, consider a flight where CAP=100 and NSF=.95 (no-show rate=5%,). Optimizer 147 calculates the expected overbooking costs for a range of AUs =100, 101, . . . 112 and chooses the AU with the minimum expected cost. To further illustrate the model, consider how Optimizer 147, in the illustrated embodiment, calculates the expected overbooking cost when AU=102:

n=the range of no-shows; the possibilities are zero no-shows (n=0), one no-show (n=1), two no-shows (n=2) . . . n={AU*5%+3*σ. For AU=102, the upper bound for n works out to 12 (rounded from 11.7). σ=the standard deviation of the distribution.

P(x=n) is the probability that the number of no-shows will equal n no-shows and the model sums the probability weighted overbooking cost (SS cost and DB cost) for each n;

The following illustrates the calculation of overbooking cost for n=3, given CAP=100, AU=102.
P(x=3) can be calculated from the binomial distribution;
Spoiled Seat Cost=SSCost(max[3-(102-100),0]=SSCost (max[1,0]) =SSCost(1). Intuitively, if an airline sells 102 tickets, (AU =102), given expect 3 no-shows (n=3), only 99 (102-3) passengers will show-up for the flight. Hence we will spoil only 1 seat given our CAP of 100 and the spoiled seat at AU=102 is=SSCost(1).
DB Cost=DBCost(max[(102-100)-3, 0])=DBCost(max[-1, 0])=DBCost(0). This implies when there are 3 no-shows for a cabin with 100 seats (CAP=100) and 102 seats are sold for the cabin (AU=102), there will be no passengers denied boarding.

Upgrade Solution

MARS 115 may include upgrade analyzer 146 module. Upgrade solution refers to a method of further optimizing the overbooking solution by considering additional cabins' (e.g., first class cabin) seats in the overbooking analysis. In various embodiments, MARS 115 determines an optimal number of additional seats that can be sold as coach seats with the intent of upgrading the passengers to the first and/or business class cabin.

One reason why upgrade solution analysis is an effective strategy for an airline is due to space available complimentary upgrades typically granted to certain passengers. Such passengers are comprised primarily of frequent fliers who book in the coach cabin but often receive a free upgrade to the first class or business cabins. Since these passengers are booked in coach (e.g., paid coach level prices for their ticket), airlines do not want to consider such complimentarily upgrade passengers in passenger demand for first class when deciding how many extra seats to add in the coach cabin as an upgrade solution.

In various embodiments, upgrade analyzer determines achievable demand (Step 605), for instance by adding the bookings for coach to demand for coach seats at any time (=t). Upgrade analyzer 146 determines that there may be excess demand for coach seats and less demand for first/business class seats (Step 610). Upgrade analyzer 146 may be configured to execute an EMSR process to determine if the seats should be sold as coach and/or first/business class seats.

In various embodiments, upgrade analyzer 146 calculates the EMSR for each first class (Step 615) seat and compares it to an EMSR for each potential additional sale of a coach seat (Steps 620 and 625). In various embodiments, this EMSR is adjusted for the risk of double sell. In this context, a double sell refers to a situation where a first/envoy class seat is offered and sold at coach prices and that seat is also sold as a first/envoy class seat. Thus, there are two booked passengers allocated to the same physical seat on the airplane. This situation often leads to an involuntary denied boarding which is associated with high cost due to government mandated cash payments and due to the generated.

In various embodiments, determining an effective upgrade solution is time sensitive. EMSR is a function of demand and the likelihood that a ticket will be sold: EMSR=demand$_t$ x p(sell)$_t$. The number of units (seats) demanded (aka "achievable demand") generally decreases as time gets closer to the departure time of the flight (T=0). Thus, one output of upgrade analyzer 146 includes the time aspect of when to sell and upgrade seats. In various embodiments, as long as EMSR$_{coach}$>=EMSR$_{first}$, upgrade solution seats are released for sale the excess demand is managed off to a level such that, (Coach Achievable Demand—Error)<= (Coach Optimized AU +#Coach Upgrade Seats).

If the EMSR of excess coach demand exceeds the EMSR of first/envoy class, additional seats are made available to the coach cabin (Step 625). In various embodiments, MARS 115 mitigates the risk of a double sell; within a predefined timeframe before a scheduled departure, MARS 115 analyzes flight booking, forecasting and cost data every half hour to adjust the number of upgrade seats being authorized by MARS 115.

With reference now to FIG. 5, in various embodiments, Upgrade Analyzer 146 obtains an achievable coach seat demand for a flight (demand$_{coach}$) of an airplane. There are a number of seats on the airplane and the seats are associated with at least one of a first class of service (first) and a second class of service (coach). Achievable demand$_{coach}$ may be calculated, in various embodiments, as bookings for coach seats plus the demand for coach seats for a timeframe from an analysis date to a date of departure of the flight (Step 505). In various embodiments, achievable demand$_{coach}$ is adjusted to account for an error in a forecast, wherein the achievable demand is based upon the forecast.

Upgrade Analyzer 146 executes an upgrade analysis to determine that an upgrade seat should be sold, the upgrade process includes:
i) determining that there is excess demand in coach (demand$_{coach}$); in various embodiments, determining that there is excess demand$_{coach}$ includes determining that the achievable demand$_{coach}$>the total number of seats in coach (CAP) (Step 510);
ii) determining an expected marginal seat revenue for a sale of an additional first class seat (EMSR$_{first}$) on the flight EMSR$_{first}$ (=a seat$_{first}$ demand price X a probability that seat$_{first}$ will be sold) (Step 515);
iii) determining an expected marginal seat revenue for a sale of an additional coach seat (EMSR$_{coach}$) on the flight as EMSR$_{coach}$ (=a seat$_{coach}$ demand price X a probability that seat$_{coach}$ will be sold) (Step 520); and,
iv) if EMSR$_{coach}$>EMSR$_{first}$, updating an upgrade authorization parameter indicating that an additional upgrade seat on the flight should be offered for sale.

In various embodiments, Upgrade Analyzer obtains seat$_{coach}$ demand price and the seat$_{first}$ demand price from an external system such as a pricing system or a revenue management system. The demand prices may be determined based upon a timeframe from an analysis date to a date of departure of the flight; e.g., the number of days until the flight departs.

In various embodiments, Upgrade Analyzer 146 repeats the upgrade analysis for all unbooked first class seats. In various embodiments, Upgrade Analyzer 146 repeats the upgrade analysis until at least one of: EMSR$_{coach}$<=EMSR$_{first}$; the total upgrade seats>=a predetermined maximum; the total upgrade seats>=a predetermined percentage of the total number of seats in coach (CAP); and the total upgrade seats>=a predetermined percentage of the total number of seats in first class.

Traditionally, overbooking systems make first class cabin seats available for sale as an "upgrade seat" immediately, based on the forecast of front cabin and coach demand meeting the conditions described above, i.e., seats are released for sale after the excess demand is managed off to a level such that, (Coach Achievable Demand—Error)<= (Coach Optimized AU +#Coach Upgrade Seats). In various embodiments, MARS 115 may be configured to recognize that demand forecasts generally improve closer to departure (a seat demand forecast 200 days prior to departure is much less reliable than one 14 days prior). In various embodiments, MARS 115 releases additional seats for sale in the coach cabin when the conditions above for managing excess demand are met AND coach cabin demand approaches the optimal total coach seats to sell (with a margin of error for over forecasts).

In various embodiments, Upgrade Analyzer 146 determines an optimal time to authorize the total number of upgrade seats to be sold and, at the optimal time, update the upgrade authorization parameter to equal the total upgrade seats. Determining the optimal time may include determining that achievable demand$_{coach}$<=an authorized number of seats to be sold in coach (AU)+total upgrade seats.

By implementing just in time inventory, MARS 115 increases yields on the added seats and reduces the risk of incorrect allocation of upgrade seats on a flight without enough demand to justify the added seats, which can have the effect of lowering yields.

While the steps outlined above represent specific embodiments of the invention, practitioners will appreciate that there are any number of computing algorithms and user interfaces that may be applied to create similar results. The steps are presented for the sake of explanation only and are not intended to limit the scope of the invention in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims of the invention.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

It should be understood that the detailed description and specific examples, indicating embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method comprising:
predicting, by a processor, a spoiled value comprising a spoiled seat (SS) cost for each passenger location in a plurality of passenger locations associated with an operation comprising a flight;
predicting, by the processor, a denied value comprising a denied boarding (DB) cost for the operation based on a probability of a volunteer not taking the flight;
determining, by the processor in real-time iteratively, a passenger no-show prediction for each passenger booked for the operation, wherein the passenger no-show prediction is based upon whether the respective passenger flew on a previous leg of a passenger flight itinerary;
storing, by the processor and in one or more connected databases, the spoiled value, the denied value, and the passenger no-show prediction;
using, by the processor, a key field in pre-selected at least one of databases or data sectors to speed searches;
conducting, by the processor, sequential searches through all tables and files to speed the searches;
sorting, by the processor, records in a file according to a known order to simplify lookup;
completing, by the processor, a database merge function by using the key field;
tuning, by the processor, the one or more connected databases to optimize database performance, wherein the tuning comprises placing frequently used files on separate file systems to reduce in and out bottlenecks; and
obtaining, by the computer-based system, the spoiled value, the denied value, and the passenger no-show prediction from the one or more connected databases;
aggregating, by the processor in real-time iteratively, the passenger no-show prediction and an unbooked passenger attendance prediction to create an overall flight prediction; and
determining, by the processor, an authorized passenger location for the operation that minimizes an overfilled value, wherein the overfilled value is based upon an accumulation of each spoiled value, the denied value and the overall flight prediction.

2. The method of claim 1, wherein data from the one or more connected aircraft databases comprises historical show rate by directional markets and record characteristics, the method further comprising analyzing, by the processor, the data using logistic regression to generate one or more predictor coefficient.

3. The method of claim 2, further comprising aggregating, by the processor, a subset of the one or more predictor coefficients associated with the data.

4. The method of claim 2, further comprising:
applying, by the processor, a default rule to the overall flight prediction that is outside of expectations; and
determining, by the processor and in response to the default rule, that the one or more predictor coefficient for a predicted market is not statistically significant.

5. The method of claim 1, wherein the determining the passenger no-show prediction comprises determining, for at least a subset of passengers booked, a conditional probability of a passenger showing for a second leg given the passenger flew a first leg; and adjusting the passenger no-show prediction in response to determining, for at least a subset of passengers booked, whether the first leg and the second leg are scheduled for the same day.

6. The method of claim 1, further comprising determining a next active leg (NAL) for a first booked passenger, wherein the first booked passenger is one of a plurality of passengers associated with the flight of the operation; and determining a first booked passenger no-show prediction as a probability that the first booked passenger will show for the NAL, wherein the passenger no-show prediction is based upon the first booked passenger no-show prediction.

7. The method of claim 1, further comprising:
transmitting, by the computer, the authorized passenger location to a reservation system and a revenue management system;
wherein the revenue management system determines, based on an updated authorized passenger location parameter, a number of additional passenger locations to be sold for the operation and a respective price for each additional passenger location;
receiving, by the computer and from the reservation system and the revenue management system, the number of additional passenger locations to be sold for the operation and the respective price for each additional passenger location;

providing, by the computer, a certain number of tickets to access the operation based on the authorized passenger location and the number of additional passenger locations; and providing access information, by the computer and in real-time, that allows access to the flight of the operation for the certain number of the tickets.

8. The method of claim 1, further comprising:

creating, by the processor and in real-time iteratively, a flight-dependent and time-dependent voucher based on the spoiled value, the denied value, the passenger no-show prediction, the unbooked passenger attendance prediction, the overall flight prediction, the authorized passenger location, the overfilled value and one or more current conditions to minimize costs, wherein the voucher dynamically and iteratively changes throughout the day to minimize costs based on the spoiled value, the denied value, the passenger no-show prediction, the unbooked passenger attendance prediction, the overall flight prediction, the authorized passenger location, the overfilled value and one or more current conditions; and providing, by the processor and in real-time iteratively and to a customer mobile device, an offer for the authorized passenger location.

9. A system comprising:

a network interface communicating with a memory;

the memory communicating with a processor for enabling revenue maximization;

the processor, when executing a computer program, executes operations comprising:

determining, by an optimizer module in communication with the processor, a capacity (CAP) from a central data repository of the one or more connected aircraft databases;

determining, by the optimizer module in communication with the processor and using a flight cost prediction model in a prediction module and in real-time iteratively throughout a period of time, an optimal authorized passenger location level that minimizes an overbooking cost;

predicting, by the processor using a cost engine, a spoiled value for each passenger location in a plurality of passenger locations associated with an operation comprising a flight;

predicting, by the processor using the cost engine, a denied value for the operation based on a probability of a volunteer not taking the flight;

determining, by the processor and based on data from the one or more connected aircraft databases, a passenger no-show prediction for each passenger for the operation, wherein the passenger no-show prediction is based upon whether the respective passenger flew on a previous leg of a passenger flight itinerary;

storing, by the processor and in one or more connected databases, the spoiled value, the denied value, and the passenger no-show prediction;

using, by the processor, a key field in pre-selected at least one of databases or data sectors to speed searches;

conducting, by the processor, sequential searches through all tables and files to speed the searches;

sorting, by the processor, records in a file according to a known order to simplify lookup;

completing, by the processor, a database merge function by using the key field;

tuning, by the processor, the one or more connected databases to optimize database performance, wherein the tuning comprises placing frequently used files on separate file systems to reduce in and out bottlenecks; and obtaining, by the computer-based system, the spoiled value, the denied value, and the passenger no-show prediction from the one or more connected databases;

aggregating, by the processor, the passenger no-show prediction and an attendance prediction to create an overall flight prediction;

determining, by the processor, an authorized passenger location for the operation that minimizes an overfilled value, wherein the overfilled value is based upon the optimal authorized passenger location level and an accumulation of each spoiled value, the denied value and the overall flight prediction;

modeling, the processor using the cost engine, the denied value as an aggregate, for each passenger denied boarding, of a breakage adjusted voucher cost, an involuntary rate draft cost, a rolling denied boarding marginal cost and a secondary accommodations cost; and updating, by the processor and on a database and in real-time iteratively throughout the period of time, an authorization parameter to create an updated authorization parameter for the flight based upon the authorized passenger location to maximize revenue for the flight and minimize costs of overbooking.

10. The system of claim 9, wherein data from the one or more connected aircraft databases comprises historical show rate by directional markets and record characteristics, the operations further comprising analyzing, by the processor, the data using logistic regression to generate one or more predictor coefficient.

11. The system of claim 10, wherein the operations further comprise aggregating, by the processor, a subset of the one or more predictor coefficients associated with the data.

12. The system of claim 9, wherein the operations further comprise:

applying, by the processor, a default rule to the overall flight prediction that is outside of expectations; and determining, by the processor and in response to the default rule, that the one or more predictor coefficient for a predicted market is not statistically significant.

13. The system of claim 9, wherein the operations further comprise:

providing, by the processor and to a revenue management system and in real-time iteratively throughout the period of time, the updated authorization parameter;

generating, by the processor, a first electronic voucher having a first authorization parameter for a first passenger based on the updated authorization parameter, wherein the first authorization parameter includes a first voucher amount and a first voucher utilization factor;

evaluating, by the processor, a denied boarding for airline flights during a time period and based on an operational factor;

determining, by the processor, an impact of the denied boarding on a plurality of the airline flights that are scheduled for departure during the period of time;

iteratively updating, by the processor, the evaluation of the denied boarding during predetermined intervals;

adjusting, by the processor and based on the updating and based on the first authorization parameter, a cost on the electronic voucher to provide a different first voucher amount for the first passenger on the airline flights throughout the day based on the latest conditions during the latest time period;

determining, by the processor, a change to the first authorization parameter for other passengers for the denied boarding for the airline flights;

adjusting, by the processor and based on the determining, the first authorization parameter on the first electronic voucher, wherein the adjusted first authorization parameter provides for a re-accommodation on an alternate accommodation flight among the airline flights in a same directional market for the first passenger throughout the day, based on a plurality of forecasts for a cost of the re-accommodation for each of a plurality of denied passengers for the flight and based on the change to the first authorization parameter for the other passengers for the denied boarding for the airline flights;

determining, by the processor, that the alternate accommodation flight is a number of hours passed the airline flights;

adjusting, by the processor, the first authorization parameter on the electronic voucher, wherein the adjusted first authorization parameter provides for access to hotel, meal and transportation (HMT) services due to the number of hours to the alternate accommodation flight; and adjusting, by the processor, a second authorization parameter on a second electronic voucher for a second passenger of the alternate accommodation flight, wherein the adjusted second authorization parameter allows for the first electronic voucher to provide access to the alternate accommodation flight by the first passenger.

14. The system of claim 9, wherein the operations further comprise:

providing, by the processor, a certain number of updated tickets to access the flight;

providing access information, by the processor and to an airline kiosk, that allows the access to the flight to certain passengers with the updated tickets, wherein the airline kiosk provides an updated boarding pass with machine readable data to the passengers;

receiving, by the processor and from an airport scanner, scanned data from the updated tickets, wherein the access to the flight is provided in response to an airport scanner scanning the machine readable data on the updated tickets and verifying the machine readable data on the updated tickets;

providing denial information, by the processor, that denies the access to the flight to denied passengers with the updated tickets; and compensating, by the processor, the denied passengers.

15. The system of claim 9, wherein the overbooking cost is based upon the CAP, the passenger no-show prediction, the spoiled value, and the denied value, wherein the denied value is based on actual passengers booked, market load factors, accommodations cost and a probability a denied boarding will result in a voucher, and wherein the denied value is dynamically calculated based upon a plurality of forecasts for a re-accommodation cost for each of a plurality of denied passengers for the flight.

16. The system of claim 9, wherein the updated authorization parameter impacts the revenue management system and a reservation system, wherein the revenue management system determines, based on the updated authorization parameter, a number of additional passenger locations to be sold for the flight that minimizes impacts of overbooking of the flight and optimizes just in time inventory for the flight and a respective price for each additional passenger location, and wherein the revenue management system transmits to the reservation system the number of additional passenger locations to be sold for the flight that minimizes the impacts of the overbooking of the flight and optimizes just in time inventory for the flight and the respective price for each of the additional passenger location.

17. A non-transitory computer-readable medium storing instructions that, when executed by processor, cause the processor to perform operations comprising:

predicting, by the processor, a spoiled value comprising a spoiled seat (SS) cost for each passenger location in a plurality of passenger locations associated with an operation comprising a flight;

predicting, by the processor, a denied value comprising a denied boarding (DB) cost for the operation based on a probability of a volunteer not taking the flight;

determining, by the processor in real-time iteratively, a passenger no-show prediction for each passenger booked for the operation, wherein the passenger no-show prediction is based upon whether the respective passenger flew on a previous leg of a passenger flight itinerary;

storing, by the processor and in one or more connected databases, the spoiled value, the denied value, and the passenger no-show prediction;

using, by the processor, a key field in pre-selected at least one of databases or data sectors to speed searches;

conducting, by the processor, sequential searches through all tables and files to speed the searches;

sorting, by the processor, records in a file according to a known order to simplify lookup;

completing, by the processor, a database merge function by using the key field;

tuning, by the processor, the one or more connected databases to optimize database performance, wherein the tuning comprises placing frequently used files on separate file systems to reduce in and out bottlenecks; and obtaining, by the computer-based system, the spoiled value, the denied value, and the passenger no-show prediction from the one or more connected databases;

aggregating, by the processor in real-time iteratively, the passenger no-show prediction and an unbooked passenger attendance prediction to create an overall flight prediction; and determining, by the processor, an authorized passenger location for the operation that minimizes an overfilled value, wherein the overfilled value is based upon an accumulation of each spoiled value, the denied value and the overall flight prediction.

* * * * *